US011123800B2

(12) United States Patent
Freidhoff et al.

(10) Patent No.: US 11,123,800 B2
(45) Date of Patent: Sep. 21, 2021

(54) PIPE EDGE PREPARATION TOOL

(71) Applicant: Concurrent Technologies Corporation, Johnstown, PA (US)

(72) Inventors: Timothy G. Freidhoff, Johnstown, PA (US); Daniel B. George, II, Homer City, PA (US); Brock T. Golesich, Johnstown, PA (US); Paul I. Sleppy, Penn Run, PA (US)

(73) Assignee: Concurrent Technologies Corporation, Johnstown, PA (US)

( * ) Notice: Subject to any disclaimer, the term of this patent is extended or adjusted under 35 U.S.C. 154(b) by 116 days.

(21) Appl. No.: 16/269,752

(22) Filed: Feb. 7, 2019

(65) Prior Publication Data

US 2019/0240736 A1 Aug. 8, 2019

Related U.S. Application Data

(60) Provisional application No. 62/627,468, filed on Feb. 7, 2018.

(51) Int. Cl.
*B23B 5/16* (2006.01)
*B23C 3/12* (2006.01)
(Continued)

(52) U.S. Cl.
CPC .............. *B23B 5/162* (2013.01); *B23B 5/168* (2013.01); *B23C 3/007* (2013.01); *B23C 3/122* (2013.01);
(Continued)

(58) Field of Classification Search
CPC ... B23B 2270/205; B23B 5/162; B23B 5/168; B23C 3/007; B23C 3/122; B23K 7/006;
(Continued)

(56) References Cited

U.S. PATENT DOCUMENTS 2,226,078 A 12/1940 Spahn
3,086,783 A 4/1963 Kelso
(Continued)

FOREIGN PATENT DOCUMENTS

CN 2686776 Y 3/2005
CN 2761329 Y 3/2006
(Continued)

OTHER PUBLICATIONS

ESCO Tool Company, "Prepzilla Millhog", I.D. Clamping Tube & Pipe Beveling Machine. Copyright 2019. Available at http://www.escotool.com/products/prepzilla-millhog-pipe-beveling-machine/.
(Continued)

*Primary Examiner* — Sara Addisu
(74) *Attorney, Agent, or Firm* — Buchanan Ingersoll & Rooney PC

(57) ABSTRACT

A tool for performing work on a workpiece, such as a pipe, includes a mandrel assembly configured to secure to an interior portion of the pipe. The mandrel assembly includes an arm assembly configured to retain a cutting apparatus so as to be positioned at an outside portion of the pipe and to allow the cutting apparatus to revolve around the circumference of the pipe to perform work on the pipe. The mandrel assembly includes a hub and a plurality of jaws that allow it to secure to the interior of the pipe while the arm assembly props the cutting apparatus in a position to facilitate performing work on the pipe around the entire circumference of a section of the pipe. The engagement between the mandrel assembly and the pipe supports the weight of the tool, providing ease of use and improved control for pipe cutting operations.

16 Claims, 11 Drawing Sheets

(51) Int. Cl.
*B23C 3/00* (2006.01)
*B23K 7/00* (2006.01)
(52) U.S. Cl.
CPC ......... *B23B 2270/205* (2013.01); *B23K 7/006* (2013.01)
(58) Field of Classification Search
CPC . Y10T 82/22; Y10T 82/2522; Y10T 82/2529; Y10T 82/16442
See application file for complete search history.

(56) References Cited

U.S. PATENT DOCUMENTS

| | | | |
|---|---|---|---|
| 3,383,723 A | | 5/1968 | Connelly |
| 3,603,182 A | * | 9/1971 | Jackman ................. B23B 5/168 82/113 |
| 3,732,758 A | * | 5/1973 | Rinaldo .................. B23C 3/007 82/113 |
| 4,318,391 A | | 3/1982 | Wachs et al. |
| 4,397,202 A | * | 8/1983 | Mayfield ................. B23B 5/162 82/128 |
| 4,469,310 A | | 9/1984 | Jones |
| 4,470,734 A | | 9/1984 | Miller |
| 4,493,232 A | * | 1/1985 | Nall ........................ B23B 5/162 279/2.14 |
| 4,543,861 A | * | 10/1985 | Kwech .................... B23B 5/162 82/113 |
| 4,614,136 A | * | 9/1986 | Pertle ..................... B23B 5/162 82/113 |
| 4,625,601 A | * | 12/1986 | Brummet ................ B23B 5/162 144/205 |
| 4,938,291 A | * | 7/1990 | Lynde ...................... B23B 5/16 166/55.8 |
| 5,110,095 A | | 5/1992 | Dougal |
| 6,050,161 A | * | 4/2000 | Tremblay ................ B23B 5/162 82/113 |
| 6,146,067 A | | 11/2000 | Owens |
| 6,189,425 B1 | * | 2/2001 | Ricci ....................... B23B 5/162 82/113 |
| 6,202,522 B1 | | 3/2001 | Tremblay |
| 6,279,437 B1 | | 8/2001 | Way |
| 8,297,157 B1 | * | 10/2012 | Miller ..................... B23C 3/007 82/113 |
| 2001/0001934 A1 | * | 5/2001 | Richards ................. B23B 5/163 82/113 |
| 2004/0035171 A1 | | 2/2004 | Gormany |
| 2004/0187658 A1 | * | 9/2004 | Moruzzi ............... B23B 31/4046 82/123 |
| 2011/0041658 A1 | * | 2/2011 | Weinberg ................ B23B 5/168 82/113 |
| 2015/0321260 A1 | * | 11/2015 | Goodman ............... B23B 5/167 82/1.11 |

FOREIGN PATENT DOCUMENTS

| | | | | |
|---|---|---|---|---|
| CN | 2825167 Y | 10/2006 | | |
| CN | 201329515 Y | 10/2009 | | |
| CN | 201776509 U | 3/2011 | | |
| CN | 202571444 U | 12/2012 | | |
| CN | 202861839 U | 4/2013 | | |
| CN | 101306481 B | 8/2013 | | |
| CN | 103612161 A | 3/2014 | | |
| CN | 203509218 U | 4/2014 | | |
| CN | 203725883 U | 7/2014 | | |
| CN | 204148618 U | 2/2015 | | |
| CN | 204148619 U | 2/2015 | | |
| EP | 1118405 A1 | * | 7/2001 | ............. B23B 5/168 |
| WO | 2011057516 A1 | 5/2011 | | |

OTHER PUBLICATIONS

Nodha Industrial Jeff, ID-Mounted Pipe Beveling Machine, May 10, 2016. Available at https://www.youtube.com/watch?v=0dOTfv4CP_w.
Steelmax Tools LLC, PB-10 (PBE-10) Pipe Beveling Machine (Pneumatic or Electric). Copyright 2019. Available at https://steelmax.com/product/pb10-pipe-beveling-machine-pneumatic-or-electric/#prettyPhoto.
Model 208B "Bevel Master", Portable Beveling/Machining System. Copyright 1995-2016. Available at https://tritool.com/product/model-208b/.

* cited by examiner

PIPE EDGE PREPARATION TOOL

CROSS-REFERENCE TO RELATED APPLICATIONS

This application is related to and claims the benefit of U.S. Provisional Application No. 62/627,468 filed on Feb. 7, 2018, the entire contents of which is incorporated herein by reference in its entirety.

FIELD OF THE INVENTION

Embodiments relate to a tool having a mandrel assembly configured to secure to an interior portion of a pipe and an arm assembly configured to prop a cutting apparatus in a position to facilitate performing work on an exterior of the pipe around an entire circumference of a section of the pipe.

BACKGROUND OF THE INVENTION

Pipe edge preparation is typically required to prepare pipe ends for butt welding. Yet, there is no pipe edge preparation tool that can accommodate size, weight, ease of use, and flexibility requirements for some working environments (e.g., a shipyard environment).

Known pipe preparation and conditioning tools are appreciated, for example, from U.S. Pat. Nos. 4,469,310, 5,110, 095, 6,146,067, 6,279,437, U.S. 2004/0035171, CN 101306481, CN 103612161, CN 202861839, CN 203509218, CN 2686776, CN 2761329, CN 2825167, CN 204148618, CN 201329515, CN 201776509, CN 202571444, CN 203725883, CN 204148619, WO 2011057516, U.S. Pat. No. 2,226,078. U.S. Pat. Nos. 3,086, 783, 3,383,723, 4,318,391, 4,470,734. U.S. Pat. Nos. 6,202, 522, 6,279,437, http://www escotool.com/products/prepzilla-millhog-pipe-beveling-machine/, https://www.youtube.com/watch?v=0dOtfv4CP_w, https://steelmnax.com/product/pb10-pipe-beveling-machine-pneumatic-or-electric/#prettyPhoto, and https://tritool.com/product/model-208b/. Known pipe preparation and conditioning tools are limited in versatility, complex and hard to maneuver, and/or require a large area of operation to use properly. These and other disadvantages can limit the use of known tools, and in particular use in compromising environments such as a shipyard for example.

SUMMARY OF THE INVENTION

Embodiments include a tool for performing work on a workpiece, such as a pipe for example. The tool includes a mandrel assembly configured to secure to an interior portion of the pipe. The mandrel assembly includes an arm assembly configured to retain a cutting apparatus located at an outside portion of the pipe and to allow the cutting apparatus to revolve around the circumference of the pipe to perform work on at least a portion of the pipe. The mandrel assembly includes a hub and a plurality of jaws that allow it to secure to the interior of the pipe while the arm assembly props the cutting apparatus in a position to facilitate performing work on an outside surface of the pipe, which includes performing work around an entire circumference of a section of the pipe. The engagement between the mandrel assembly and the pipe is configured to support the weight of the tool, providing ease of use and improved control for pipe cutting operations.

In at least one embodiment, the mandrel assembly is adjustable to expand and grip the inside surface of the pipe sidewalls. A shaft of the mandrel assembly is used to actuate the expansion of the mandrel jaws. The shaft is also used to prop and position the cutting apparatus. Some configurations of the tool keep the mandrel assembly centered within the pipe diameter (e.g., coaxial with the pipe's longitudinal axis) and ensures that axis of the cutting head of the cutting apparatus is parallel to the pipe's longitudinal axis (i.e., normal to the pipe edge the cutting head is performing work on). This facilitates generating a uniform cut in or on the pipe.

The tool also reduces the weight that an operator has to support and reduce the physical effort exerted by the operator when using the tool, because the mandrel assembly is secured to the pipe and the mandrel assembly supports the cutting apparatus, thereby causing the pipe to bear the majority of the weight of the tool and the majority of the loads associated with using the tool. The bulk of the tool is mounted to the interior of the pipe, which reduces the space (e.g., the area of operation) to operate the tool. The small size and weight of the tool affords the operator the ability to easily carry the tool to a work site and install it in or on in-place pipe. The adjustable nature of the mandrel assembly and the interchangeability of various components of the tool facilitate performing multiple types of cuts on a pipe. This also facilitates performing separate cuts for separate pipes using the same tool, wherein each pipe has diameters ranging from 3 to 12 inches.

It should be noted that one mandrel assembly is used to support both a cut off tool (e.g., straight cut cutting head) and a beveling tool (e.g., a beveling cut cutting head). The cut off tool (e.g., generating a straight cut) removes a short length of the pipe for fit up and leave a pipe end that is square or perpendicular to the axis of the pipe. In some embodiments, the mandrel assembly is self-centering and self-aligning with the axis of the pipe, thus ensuring a square cut.

With the cut off tool, the system is configured to set the longitudinal location of the cut along the pipe and keep the cutting wheel perpendicular to the pipe wall. The depth of cut and the travel around the pipe circumference are free and controlled by the operator. With the beveling tool, the size of the bevel is set by a combination of the mechanical stop (e.g., the longitudinal stop) of the mandrel assembly (see ref. 164 in FIG. 5) and a peg (e.g., the radial stop) of a leading guide (see ref. 160 in FIG. 5). This, along with the hinged arms of the arm assembly, allows the tool to create an acceptable bevel on slightly out-of-round pipes. With some embodiments, once the radial stop is initially set, there is no need for further adjustment.

In at least one embodiment, a mandrel assembly for pipe edge preparation includes a shaft having a shaft first end and a shaft second end with a shaft longitudinal axis running from the shaft first end to the shaft second end. The mandrel assembly includes a hub rotatingly engaged with the shaft. The hub includes a plurality of jaws. Each jaw maybe configured to extend radially from the shaft as the shaft is rotated in a first direction relative to the hub. Each jaw may be configured to retract radially toward the shaft as the shaft is rotated in a second direction relative to the hub. The mandrel assembly includes an arm assembly extending from the shaft at or near the shaft first end. The arm assembly is configured to receive and retain an apparatus. The mandrel assembly is configured to be inserted into an interior portion of the pipe via a pipe end and secure to a sidewall inner surface of the pipe by causing the plurality of jaws to extend radially from the shaft and press against the sidewall inner surface of the pipe. The apparatus is configured to perform work on a sidewall outer surface of the pipe at or near a circumferential edge of the pipe by manual rotation of the arm assembly.

In some embodiments, the plurality of jaws includes a first jaw, a second jaw, and a third jaw. In some embodiments, each jaw of the plurality of jaws extends radially from the shaft in unison and retracts radially toward the shaft in unison. In some embodiments, at least one jaw includes a shoe attached to a portion thereof. In some embodiments, the shoe is attached to the at least one jaw via a pivot arrangement. In some embodiments, the mandrel assembly includes a mechanical stop disposed on a portion of the shaft. The mechanical stop is configured to prevent movement of the arm assembly along the shaft longitudinal direction. In some embodiments, the mechanical stop includes at least one flat threadingly engaged with the shaft to facilitate adjusting a location of the mechanical stop along the shaft longitudinal axis. In some embodiments, the arm assembly includes an arm first end and an arm second end. The arm first end includes an arm aperture with a bearing assembly or a race assembly to facilitate free rotation of the arm first end about the shaft. The arm second end includes a receptacle configured to receive and retain the tool. In some embodiments, the arm aperture is configured to facilitate slidable motion of the arm assembly with respect to the shaft. In some embodiments, the arm first end includes a first arm section and the arm second end comprises a second arm section. The first arm section is rotatingly engaged with the second arm section via a bearing assembly or a race assembly. In some embodiments, the second arm section includes a leading guide extending from a distal end of the second arm section. In some embodiments, the leading guide includes an extension extending along the shaft longitudinal axis and a peg extending radially inward towards the shaft longitudinal axis. In some embodiments, the peg is a threaded bolt threadingly engaged with a threaded aperture of the extension. In some embodiments, the leading guide includes a shield. In some embodiments, the shield is an open canister shaped member. In some embodiments, the rotating engagement between the first arm section and the second arm section includes an adjuster to temporarily stop rotation of the second arm section relative to the first arm section.

In at least one embodiment, a pipe preparation tool includes a mandrel assembly. The mandrel assembly includes a shaft having a shaft first end and a shaft second end with a shaft longitudinal axis running from the shaft first end to the shaft second end. The mandrel assembly includes a hub rotatingly engaged with the shaft. The hub includes a plurality of jaws. Each jaw is configured to extend radially from the shaft as the shaft is rotated in a first direction relative to the hub. Each jaw is configured to retract radially toward the shaft as the shaft is rotated in a second direction relative to the hub. The mandrel assembly includes an arm assembly extending from the shaft at or near the shaft first end. The arm assembly includes an arm first end and an arm second end. The arm first end has an arm aperture with a first bearing assembly or a first race assembly to facilitate free rotation of the arm first end about the shaft. The arm second end includes a receptacle configured to receive and retain a cutting apparatus configured to perform work on a pipe. The arm first end includes a first arm section and the arm second end comprises a second arm section. The first arm section is rotatingly engaged with the second arm section via a second bearing assembly or a second race assembly. The mandrel assembly is configured to be at least partially inserted into an interior portion of the pipe via a pipe end while the arm assembly positions the cutting apparatus at an exterior of the pipe. The cutting apparatus is rotated about a circumference of the pipe as the arm assembly is manually caused to revolve about the shaft. A cutting head of the cutting apparatus makes contact with an outer surface of the pipe to generate a cut at or near a circumferential edge of the pipe.

In some embodiments, at least one jaw has a shoe pivotally attached to a portion thereof.

In at least one embodiment, a method of performing work on a pipe edge involves inserting a mandrel assembly at least partially into an interior of a pipe via a pipe end, the mandrel assembly including a shaft, a hub, a plurality of jaws, and an arm assembly, the arm assembly being rotatingly attached to the shaft wherein each jaw has a shoe pivotally attached to a portion thereof. The method further involves extending each jaw of the plurality of jaws radially from the shaft by rotating the shaft relative to the hub to cause each shoe to make contact with an inner surface sidewall of the pipe and to secure the mandrel assembly to the pipe, wherein each shoe remains parallel with the shaft at all times. The method further involves inserting a cutting apparatus into a receptacle of the arm assembly, the cutting apparatus including a cutting head. The method further involves causing the arm assembly to rotate about the shaft to force the cutting apparatus to revolve about a circumference of at least a portion of the pipe and to force the cutting head to perform work on an at least an outer surface sidewall of at least the portion of the pipe at or near a circumferential edge of the pipe.

In some embodiments, the method involves extending each jaw of the plurality of jaws radially from the shaft to cause the mandrel assembly to self-center and to self-align with a longitudinal axis of the pipe. In some embodiments, causing the arm assembly to rotate about the shaft to force the cutting apparatus to revolve about the circumference of at least a portion of the pipe occurs at a set location along a longitudinal axis of the pipe. In some embodiments, the cutting head remains perpendicular to the outer surface sidewall of the pipe. In some embodiments, each of a depth at which the cutting head enters the sidewall of the pipe and the movement of the cutting head about the circumference of at least a portion of the pipe is freely controlled by a user.

In some embodiments, performing work on the pipe involves using a first cutting head to perform a straight cut and replacing the first cutting head with a second cutting head to perform a bevel cut without disengaging the mandrel assembly from the interior of the pipe. In some embodiments, the straight cut removes a length of the pipe so that a terminus of the pipe is square or perpendicular to a longitudinal axis of the pipe. In some embodiments, a size of the bevel cut is set by a combination of a mechanical stop and a peg of a leading guide, wherein the peg is set once without being re-set. In some embodiments, the bevel cut is generated on the pipe when the outer surface sidewall is slightly out-of-round pipe.

In at least one embodiment, a mandrel assembly for pipe edge preparation includes a shaft having a shaft proximal end and a shaft distal end with a shaft longitudinal axis running from the shaft proximal end to the shaft distal end. The mandrel assembly includes a hub rotatingly engaged with the shaft, the hub having a plurality of jaws, each jaw positioned equidistantly about the shaft longitudinal axis. Each jaw includes a first leg pivotally attached to the hub, a second leg pivotally attached to the hub, and a shoe pivotally attached to the first leg and the second leg so that the shoe of each jaw is parallel to the shaft longitudinal axis. Each of the first leg and the second leg of each jaw is configured to pivot in unison as the shaft is rotated relative to the hub. The pivoting motion of the first leg and the second leg of each jaw causes the shoe pivotally attached thereto to move radially toward or away from the shaft so that the shoe remains parallel to the shaft longitudinal axis during the movement of the shoe toward and away from the shaft. The mandrel assembly includes an arm assembly extending from the shaft at or near the shaft proximal end, the arm assembly configured to receive and retain an apparatus. The mandrel assembly is configured to be inserted into an interior portion of the pipe via a pipe end so that the shaft distal end spearheads the insertion. The mandrel assembly is configured to secure to a sidewall inner surface of the pipe by causing the plurality of shoes to extend radially from the shaft and press against the sidewall inner surface of the pipe. The apparatus is configured to perform work on a sidewall outer or inner surface of the pipe at or near a circumferential edge of the pipe by manual or automatic rotation of the arm assembly.

As noted above, embodiments of the tool are directed towards a tool for cutting sections of a pipe and/or for prepping an already cut-edge of the pipe. The tool has a mandrel assembly configured to secure to an interior portion of the pipe via jaws that expand radially to engage the inner surface of the pipe. The tool is configured so that shoe portions of the jaws remain parallel to the inner surface of the pipe as the jaws expand for engaging therewith. The jaws are configured to expand in an umbrella-like fashion. A pivoting arm assembly is attached to the mandrel assembly and is used as a carriage for a cutting and/or a beveling apparatus. The pivoting arm assembly is configured to retain the cutting/beveling apparatus so as to be positioned at an inside or outside portion of the pipe and to allow the cutting/beveling apparatus to be manually (e.g., without mechanical assistance) or automatically revolved around the circumference of the pipe to perform work on the pipe. The engagement between the mandrel assembly and the pipe supports the weight of the tool, providing ease of use and improved control for pipe cutting operations. The tool is lightweight in construction, allowing it to be portable and used in a variety of difficult applications, such as, for example, on a pipe that has already been installed and needs to be modified. In addition, the tool facilitates cutting a section of the pipe, interchanging the cutting tool with a beveling tool without disengaging the mandrel assembly from the pipe, and seamlessly continuing with beveling the cut-edge of the pipe.

Aspects of the tool that lead to its lightweight and maneuverability includes: a) the configuration of the mandrel assembly with the pivoting legs and jaws to secure to the inner surface of the pipe; b) the pivoting arm assembly to facilitate manual rotation and cutting/beveling; c) the pivoting arm assembly that allows for cutting and beveling tools to be interchangeable without having to remove the mandrel or arm assemblies.

Conventional tools do not utilize a plurality of jaws that expand and contract in an accordion-like or umbrella rib-like fashion via pivoting legs attached at either end. This feature of the inventive tool allows for a lighter, less complex construction, and provides for a wider range of motion so as to accommodate a wide range of the pipe diameters. While conventional tools may use workpiece securing elements that are attached to a mandrel shaft and move radially, their structure and movement are different and movement is limited due the mechanics involved.

In addition, conventional tools can only be configured for beveling (or some other edge-face preparation) of the pipe, and not for cutting. One of the reasons for this is because the cutting blade(s) are attached to an under-face of a rotary head, the under-face being positioned adjacent and normal to the pipe edge.

Other conventional tools designed for cutting (not beveling) are limited to cutting billets or piles. Such conventional tools have a carriage (holding a cutting blade) that attaches to a gear track secured to a clamp, the clamp being secured to an outer surface of the billet. The carriage and gear track facilitate motorized orbital movement of the carriage (and the cutting blade) about the billet. In contrast, the pivoting arm assembly of the inventive tool revolves around hub disposed on the shaft of the mandrel assembly. This is done to specifically accommodate operating on a pipe, allowing the mandrel assembly to be inserted into the pipe. This also significantly reduces the complexity, weight, and volume of space occupied by the device. This further allows for manual movement of the pivoting arm assembly about the pipe, leading to a more flexible and controlled cutting operation. The mechanically operated carriages of conventional devices, on the other hand, require additional mechanical parts, add bulkiness to the device, and limits control of orbital movement of the cutting tool.

Moreover, conventional devices do not provide any means that facilitate interchanging the cutting blade of the tool to allow for cutting and beveling without having to remove the mandrel. In contrast, the inventive tool facilitates cutting a section of the pipe, interchanging the cutting tool with a beveling tool without disengaging the mandrel assembly from the pipe, and seamlessly continuing with beveling the cut-edge of the pipe.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1:
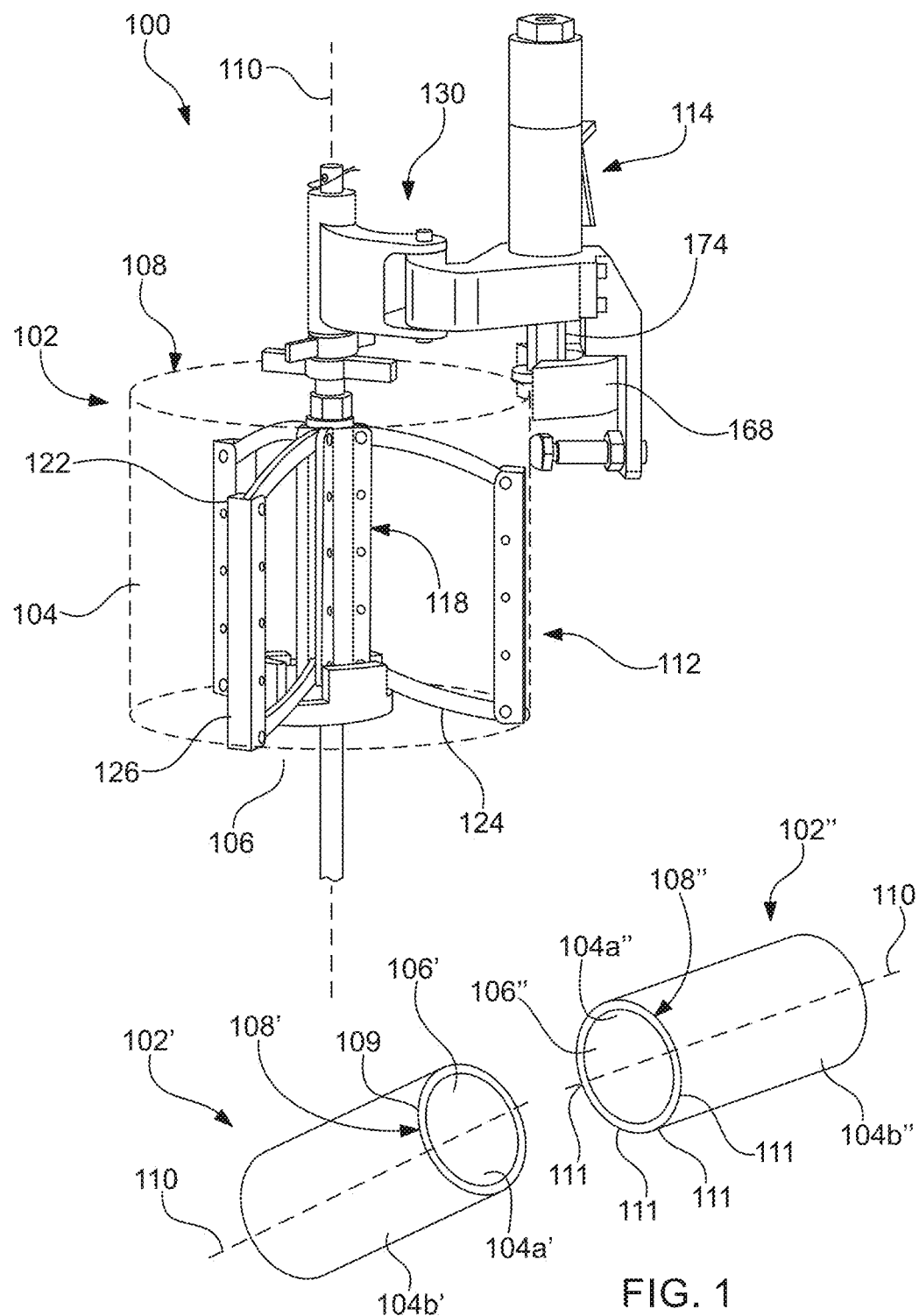
FIG. 1 is an embodiment of a tool shown in connection with a section of the pipe.
Figure 2:
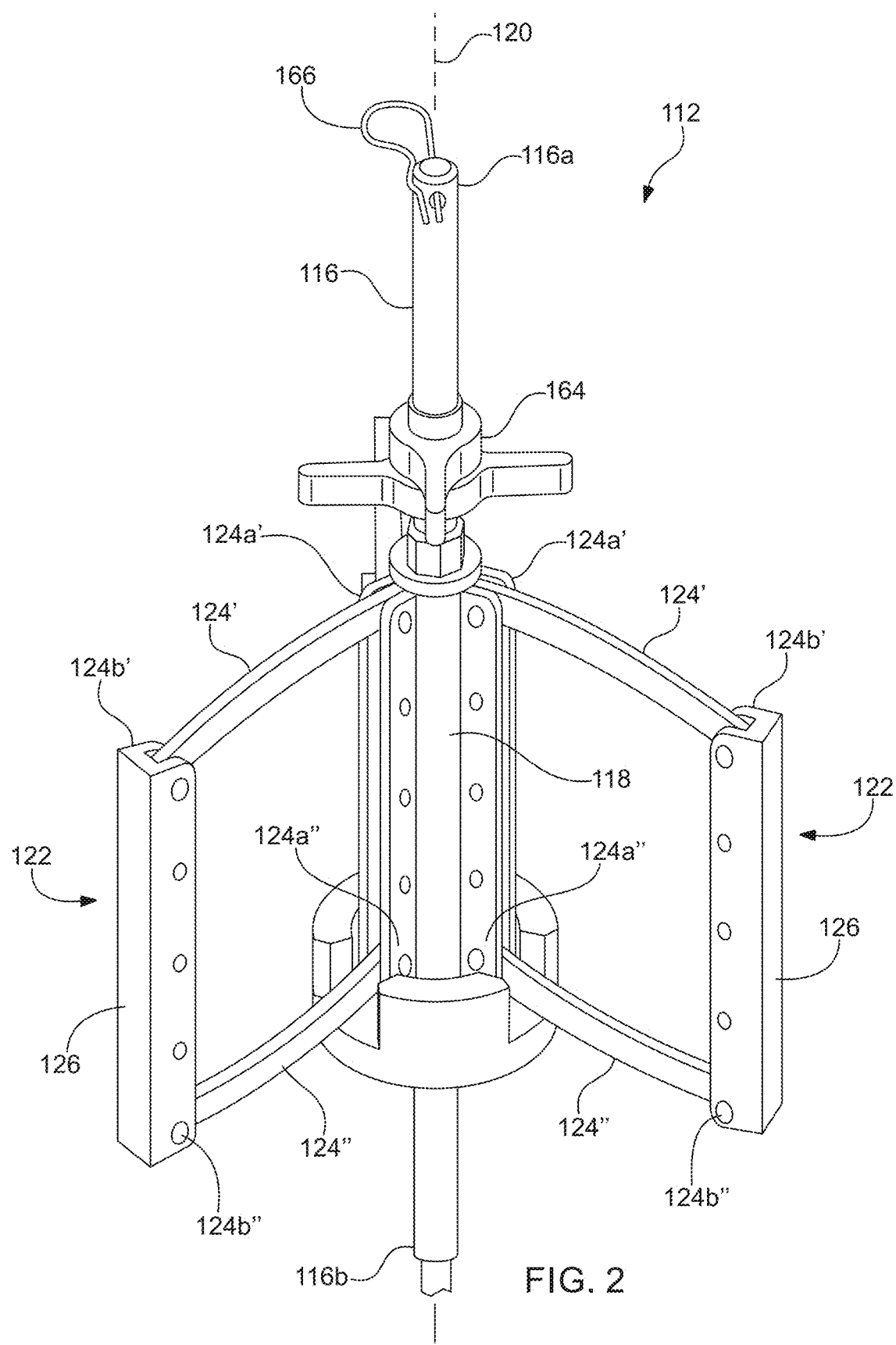
FIG. 2 is an embodiment of a mandrel assembly that may be used with an embodiment of the tool.

Referring to FIGS. 1-3, embodiments includes a tool 100 configured for performing work on a workpiece 102. Use of the tool 100 includes use of any one or a combination of component parts of the tool 100. The workpiece 102 is a structural member, a portion of which is in need of preparing, conditioning, etc. For example, the workpiece 102 is a metal structure having an end portion that has to be prepared or conditioned for welding. It is contemplated for the workpiece 102 to be a tubular member, such as a pipe 102 for example. However, the tool is used to perform work on other types of workpieces 102.

The pipe 102 is a tubular structure having sidewalls 104 and a hollow interior 106 with a pipe end 108. The pipe end 108 is an opening at the terminus of the pipe 102 leading to the interior 106 of the pipe 102. The sidewalls 104 have a sidewall inner surface 104a and a sidewall outer surface 104b. The pipe 102 is an elongated structure having a pipe longitudinal axis 110. The pipe 102 is a workpiece having a pipe end 108, the pipe end 108 being in need of preparation or conditioning to facilitate abutting the pipe end 108 to another pipe 102. It is contemplated for the pipe 102 to be fabricated from metal or other material. The abutment is done to facilitate welding the pipe end 108 of one pipe 102 to the pipe end 108 of another pipe 102. As an example, there is a first pipe 102' having a first pipe end 108' and a second pipe 102" having a second pipe end 108". It may be desired to weld the first pipe 102' to the second pipe 102" by first causing the first pipe end 108' to abut the second pipe end 108" and then welding the first pipe end 108' to the second pipe end 108". Prior to welding, a proper abutment between the two pipe ends 108', 108" may be desired. Performing work on the pipe ends 108', 108" facilitates the proper abutment by conditioning the pipe end 108 of either pipe 102.

The tool 100 is used to perform work on the first pipe end 108' and/or the second pipe end 108" to facilitate a proper abutment for welding. The work performed on the pipe 102 includes cutting, grinding, abrading, burnishing, etc. to remove at least a portion of the material comprising the pipe 102. A proper abutment may include causing a predetermined amount of an edge of the first pipe end 108' to make contact with a predetermined amount of an edge of the second pipe end 108" when the first pipe end 108' and the second pipe end 108" are cause to abut each other. A proper abutment may be to cause the first pipe 102' to extend coaxially from the second pipe 102" when the first pipe end 108' and second pipe end 108" are caused to abut each other. These may be achieved by generating a straight cut on any one or both pipe ends 108', 108". A straight cut is defined as a cut through a sidewall 104 of the pipe all the way around a circumference of the pipe 102 so that the newly cut edge forms the terminus of the pipe end 108. The straight cut for a pipe end 108 is made such that the profile of the straight cut all the way around the circumference of the pipe sidewall 104 is perpendicular to the pipe longitudinal axis 110. The straight cut for a pipe end 108 is made such that a top surface of newly cut edge of the straight cut all the way around the circumference of the pipe sidewall 104 is perpendicular to the pipe longitudinal axis 110 of the pipe 102.

Figure 11A:
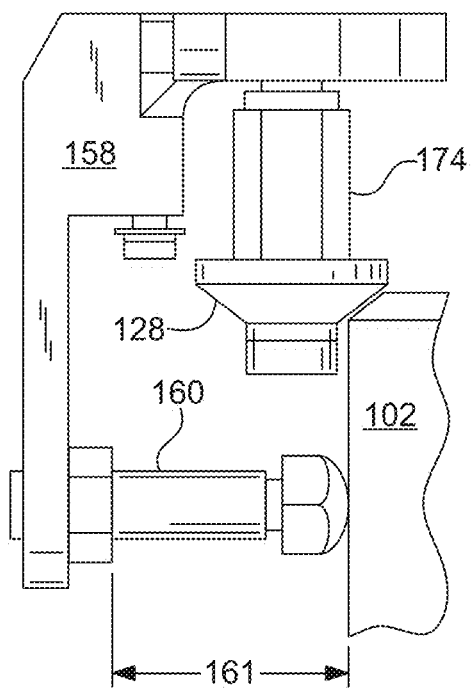
FIG. 11A shows an embodiment of the tool used to generate a beveled cut on a section of the pipe.

As another example, a proper abutment may include increasing or maximizing contact between the surface area of the edge the first pipe end 108' and the surface area of the edge of the second pipe end 108" when the first pipe end 108' and second pipe end 108" are caused to abut each other. This may be achieved by generating a beveled cut on any one or both pipe ends 108', 108" (see FIG. 11A). A beveled cut is defined as a cut through a sidewall 104 of the pipe 102 all the way around a circumference of the pipe 102 so that the newly cut edge forms the terminus of the pipe end 108. The beveled cut for a pipe end 108 is made such that the profile of the beveled cut all the way around the circumference of the pipe sidewall 104 is perpendicular to the pipe longitudinal axis 110. The beveled cut for a pipe end 108 is made such that a top surface of newly cut edge of the beveled cut all the way around the circumference of the pipe 102 sidewall is not normal (e.g., at an obtuse or acute angle relative to) to the pipe longitudinal axis 110.

Figure 11B:
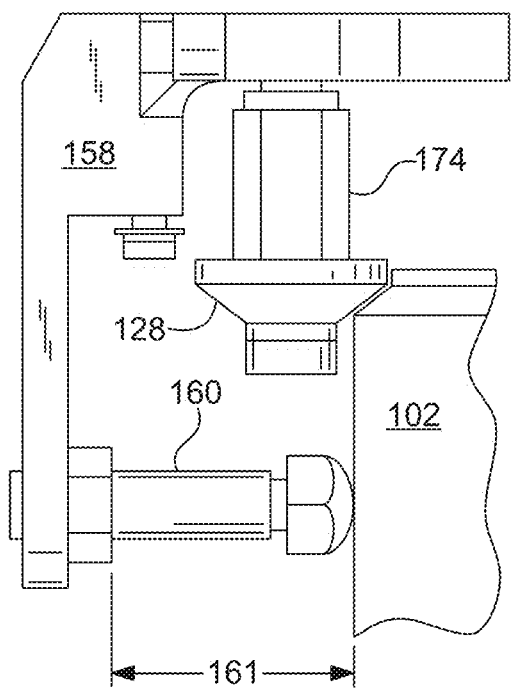
FIG. 11B shows an embodiment of the tool being used to generate a j-beveled cut on a section of the pipe.

Other cuts can be made. These include a rounded cut. The rounded cut is defined as a cut through a sidewall 104 of the pipe all the way around a circumference of the pipe 102 so that the newly cut edge forms the terminus of the pipe end 108. The rounded cut for a pipe end 108 is made such that the profile of the rounded cut all the way around the circumference of the pipe sidewall 104 is perpendicular to the pipe longitudinal axis 110. The rounded cut for a pipe end 108 is made such that a top surface of newly cut edge of the rounded cut all the way around the circumference of the pipe sidewall 104 is arcuate or convex to the pipe longitudinal axis 110. Another cut is a j-bevel or step bevel cut. (See FIG. 11B). The j-bevel cut is defined as a cut through a sidewall 104 of the pipe all the way around a circumference of the pipe 102 so that the newly cut edge forms the terminus of the pipe end 108. The j-bevel cut for a pipe end 108 is made such that the profile of the j-bevel cut all the way around the circumference of the pipe sidewall 104 is perpendicular to the pipe longitudinal axis 110. The j-bevel cut for a pipe end 108 is made such that a top surface of newly cut edge of the rounded cut all the way around the circumference of the pipe sidewall 104 is partially normal to and partially not normal to the pipe longitudinal axis 110 (e.g., forming a bevel leading to a step or having a sweeping profile whose angle to the pip longitudinal axis 110 varies across at least a portion of the pipe sidewall.)

Any of the cuts is made at or near an edge 109 of the pipe end 108. In some embodiments, the cut is made at or near at least the outside portion of the edge 109. Portions of the pipe that are at or near the outside portion of the edge 109 are referred to herein as a circumferential edge 111 of the pipe 102.

Embodiments of the tool 100 include a mandrel assembly 112. The mandrel assembly 112 is configured to secure to a portion of the pipe 102. This includes securing temporarily to a portion of the pipe 102. The mandrel assembly 112 includes a structure configured to be inserted, at least partially, into a portion of the pipe 102. The mandrel assembly 112 is inserted into the pipe 102 by being slid through the pipe end 108. Inserting the mandrel assembly 112 includes causing at least a portion of the mandrel assembly 112 to be located in the hollow interior 106 of the pipe 102.

Embodiments of the mandrel assembly 112 are structured to support a cutting apparatus 114. In some embodiments, the mandrel assembly 112 is secured to a portion of the pipe 102 and supports the cutting apparatus 114 to facilitate performing work on the pipe 102 with the cutting apparatus 114. For example, the mandrel assembly 112 is configured to secure to at least a portion of the hollow interior 106 of the pipe 102 at or near the pipe end 108 while supporting the cutting apparatus 114 so that the cutting apparatus 114 is positioned at an exterior of the pipe 102 at or near the pipe end 108. The mandrel assembly 112 is configured to allow the cutting apparatus 114 to rotate about the pipe longitudinal axis 110. Rotating the cutting apparatus 114 about the pipe longitudinal axis 110 facilitate performing work on the pipe 102.

Embodiments of the mandrel assembly 112 include a shaft 116. The shaft 116 is an elongated member rotatingly attached to a hub 118. The shaft 116 includes a shaft first end 116*a* (or proximal end—the end most proximal to the user) and a shaft second end 116*b* (or distal end—the end most distant to the user) with a shaft longitudinal axis 120 running from the shaft first end 116*a* to the shaft second end 116*b*. While it is contemplated for the hub 118 to be attached to the shaft 116 at or near the shaft second end 116*b*, the hub 118 is attached anywhere along the shaft 116. The hub 118 includes gearing and a plurality of jaws 122. The gearing of the hub 118 is configured as a chuck assembly, for example, so that rotation of the shaft 116 relative to the hub 118 causes the jaws 122 to extend or retract radially to and from the shaft 116 depending on the direction of rotation of the shaft 116. For example, the hub 118 includes a scroll gear having a spiral grooved back end configured to engage each jaw 122 such that when the scroll gear is rotated the groove causes the jaws 122 to motion radially outward from the shaft longitudinal axis 120 or inward to the shaft longitudinal axis 120. At least a portion of the shaft 116 that engages the hub 118 is threaded so that rotating the shaft 116 causes the threads of the shaft 116 to engage the scroll gear of the hub 118. Other types of hubs 118 and hub configurations are contemplated.

In some embodiments, the plurality of jaws 122 is spaced equidistant from each other. For example, the plurality of jaws 122 includes a first jaw 122, a second jaw 122, and a third jaw 122. Each of the first jaw 122, the second jaw 122, and the third jaw 122 is spaced about the hub 118 so that each is equidistant from each other. In some embodiments, each jaw 122 of the plurality of jaws 122 is caused to move radially inward or outward simultaneously, or in unison. For example, rotating the shaft 116 relative to the hub 118 in a first direction (e.g., clockwise) causes each of the first jaw 122, the second jaw 122, and the third jaw 122 to move radially outward in unison, which includes each jaw 122 moving radially outward at a rate that is equal to the rate at which each other jaw 122 moves. Rotating the shaft 116 relative to the hub 118 in a second direction (e.g., a direction that is opposite that of the first direction—counterclockwise) causes each of the first jaw 122, the second jaw 122, and the third jaw 122 to move radially inward in unison, which includes each jaw 122 moving radially inward at a rate that is equal to the rate at which each other jaw 122 moves.

A jaw 122 includes at least one leg 124 engaged with the hub 118. For example, the jaw 122 includes a first leg 124' and a second leg 124". The first leg 124' is positioned more proximal the shaft first end 116*a* than that of the second leg 124". The second leg 124" is positioned more proximal the shaft second end 116*b* than that of the first leg 124'. The first leg 124' and the second leg 124" are configured to move in unison as the shaft 116 is rotated relative to the hub 118 so as to cause the jaw 122 to move radially relative to the shaft longitudinal axis 120. Any one jaw 122 may have the same or different configuration as that of another jaw 122. For example, each of the first jaw 122, second jaw 122, and third jaw 122 may each have a unique set of first and second legs 124', 124". As another example, the first jaw 122 may have a set one leg 124, whereas the second jaw 122 may have two legs 124.

The first leg 124' has a first leg first end 124*a*' and a first leg second end 124*b*'. The first leg first end 124*a*' is engaged with the hub 118. This is via a pivot engagement. The first leg second end 124*b*' is configured to make contact with the sidewall inner surface 104*a* of the pipe 102 as the first leg 124' is caused to move radially outward from the shaft longitudinal axis 120. In some embodiments the first leg second end 124*b*' is configured to removably secure a shoe 126 to a portion thereof. This is achieved via a cotter pin 116 type securement, for example. The shoe 126 is configured to make contact with the sidewall inner surface 104*a* of the pipe 102 as the first leg 124' is caused to move radially outward from the shaft longitudinal axis 120. The second leg 124" have a second leg first end 124*a*" and a second leg second end 124*b*". The second leg first end 124*a*" is engaged with the hub 118. This is via a pivot engagement. The second leg second end 124*b*" is configured to make contact with the sidewall inner surface 104*a* of the pipe 102 as the second leg 124" is caused to move radially outward from the shaft longitudinal axis 120. In some embodiments the second leg second end 124*b*" is configured to removably secure (e.g., via a cotter pin type engagement) a shoe 126 to a portion thereof. The shoe 126 is configured to make contact with the sidewall inner surface 104*a* of the pipe 102 as the second leg 124" is caused to move radially outward from the shaft longitudinal axis 120. In some embodiments, the shoe 126 is removably secured to the first leg second end 124*b*' and the second leg second end 124*b*". For example, the shoe 126 is an elongated member configured to extend from the first leg second end 124*b*' to the second leg second end 124*b*". The shoe 126 is pivotally attached to the first leg second end 124*b*' and to the second leg second end 124*b*".

In some embodiments, each jaw 122 includes a first leg 124' having a first leg first end 124*a*' and a first leg second end 124*b*' (the first leg first end 124*a*' being pivotally attached to the hub 118) and a second leg 124" having a second leg first end 124*a*" and a second leg second end 124*b*" (the second leg first end 124*a*" being pivotally attached to the hub 118). Each jaw 122 has a shoe 126 pivotally attached to the first leg second end 124*b*' and pivotally attached to the second leg second end 124*b*" of each jaw 122. As each jaw 122 is caused to contract, each shoe 126 moves radially inward towards the shaft 116. As each jaw 122 is caused to expand, each shoe 126 moves radially outward away from the shaft 116. As the jaws 122 expand and contract, each shoe 126 remains parallel with the shaft 116 so as to allow the mandrel assembly 112 to expand and contract in an accordion-like or umbrella-like fashion. When the mandrel assembly 112 is inserted into the pipe 102 and the pipe longitudinal axis 110 and the mandrel shaft longitudinal axis 120 are aligned or co-axial, the shoes 126 of the jaws 122 will also remain parallel to the sidewall inner surface 104a of the pipe 102 as the mandrel assembly 112 expands and contracts.

It is contemplated for the mandrel assembly 112 to be transitioned to the contracted position (see FIG. 10) before being inserted into the pipe 102. Once inserted to a desired location, the mandrel assembly 112 is expanded to cause the jaws 122 to move radially away from the mandrel shaft 116. Due to the pivotal arrangement of the shoes 126, each shoe 126 remains parallel with the shaft 116 as the mandrel shaft 116 is transitioned to the expanded position (see FIG. 5). Again, when the pipe longitudinal axis 110 and the mandrel shaft longitudinal axis 120 are aligned or co-axial, the shoes 126 of the jaws 122 will also remain parallel to the sidewall inner surface 104a of the pipe 102 as the mandrel assembly 112 expands. As the mandrel assembly expands, the shoes 126 abut and press against the sidewall inner surface 104a of the pipe 102 to form a secure engagement therewith.

The mandrel assembly 112 is inserted, at least partially, into a portion of the pipe 102. The mandrel assembly 112 is inserted into the pipe 102 by being slid through the pipe end 108 of the pipe 102. This includes sliding the mandrel assembly 112 so that the shaft second end 116b spearheads the insertion. Inserting the mandrel assembly 112 includes causing at least a portion of the hub 118 to be located in the hollow interior 106 of the pipe 102. Inserting the mandrel assembly 112 includes causing at least a portion of the hub 118 to be located at or near the pipe end 108. Inserting the mandrel assembly 112 includes adjusting the jaws 122 such that a perimeter profile formed by each jaw 122 has a diameter that is less than an inner diameter of the pipe 102 so as to allow the mandrel assembly 112 to be slid into the interior 106 of the pipe 102. For example, the shaft 116 is rotated to cause each jaw 122 to move radially inward towards the shaft 116 until the perimeter profile formed by each jaw 122 has a diameter that is less than an inner diameter of the pipe 102, allowing the mandrel assembly 112 to be inserted into the pipe 102 via the pipe end 108. Once inserted, the mandrel assembly 112 is positioned such that the shaft longitudinal axis 120 and the pipe longitudinal axis 110 are parallel, which includes being coaxial. The shaft 116 is rotated to cause the jaws 122 to extend radially until each of the jaws 122 and/or each of the shoes 126 of a jaw 122 make contact with the sidewall inner surface 104a of the pipe 102. The shaft 116 is further rotated to cause the each of the jaws 122 and/or each of the shoes 126 of a jaw 122 to press against the sidewall inner surface 104a of the pipe 102. This causes the mandrel assembly 112 to secure firmly to the pipe 102.

Figure 3A:
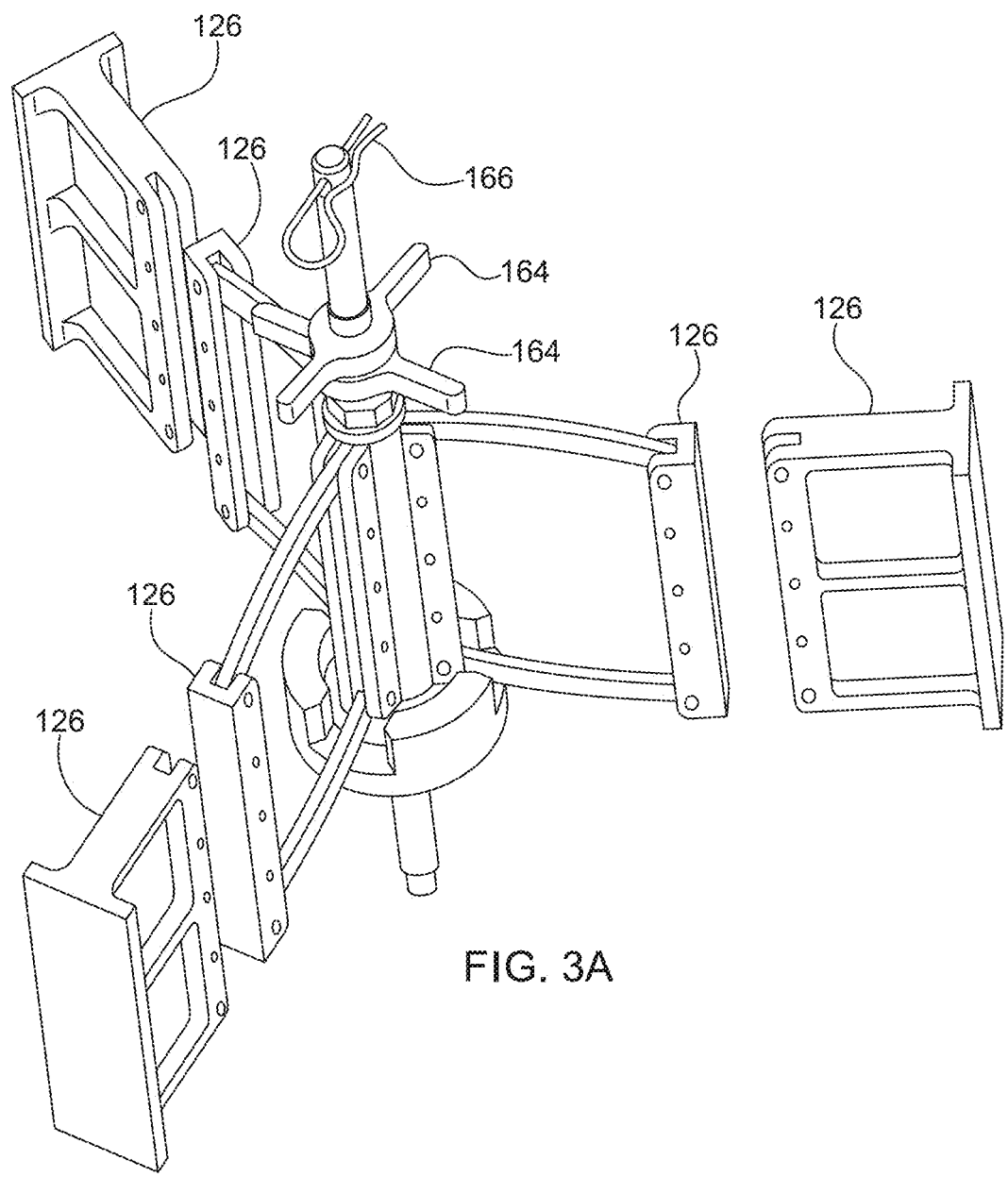
FIG. 3A is an embodiment of a mandrel assembly showing different interchangeable shoes.
Figure 3B:
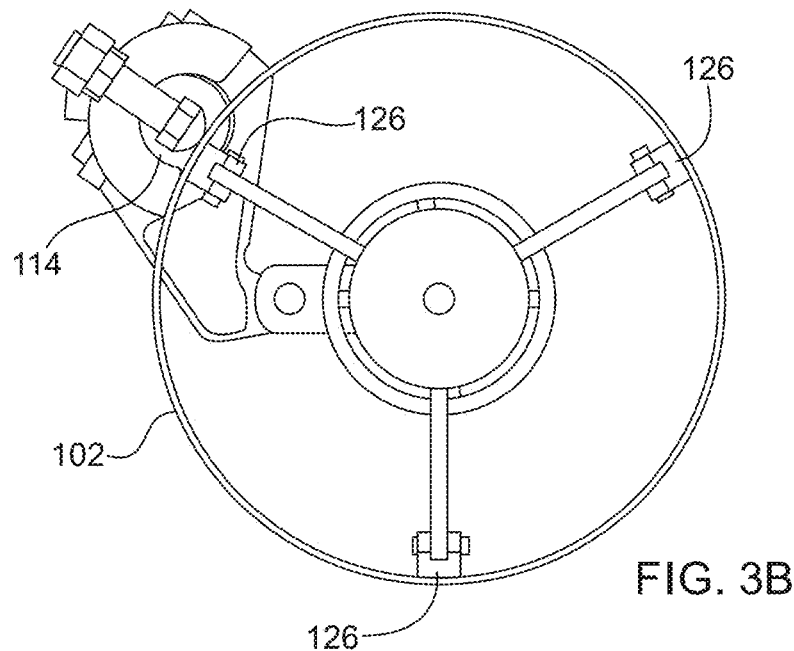
FIG. 3B shows an embodiment of a mandrel assembly with a first embodiment of a shoe.
Figure 3C:
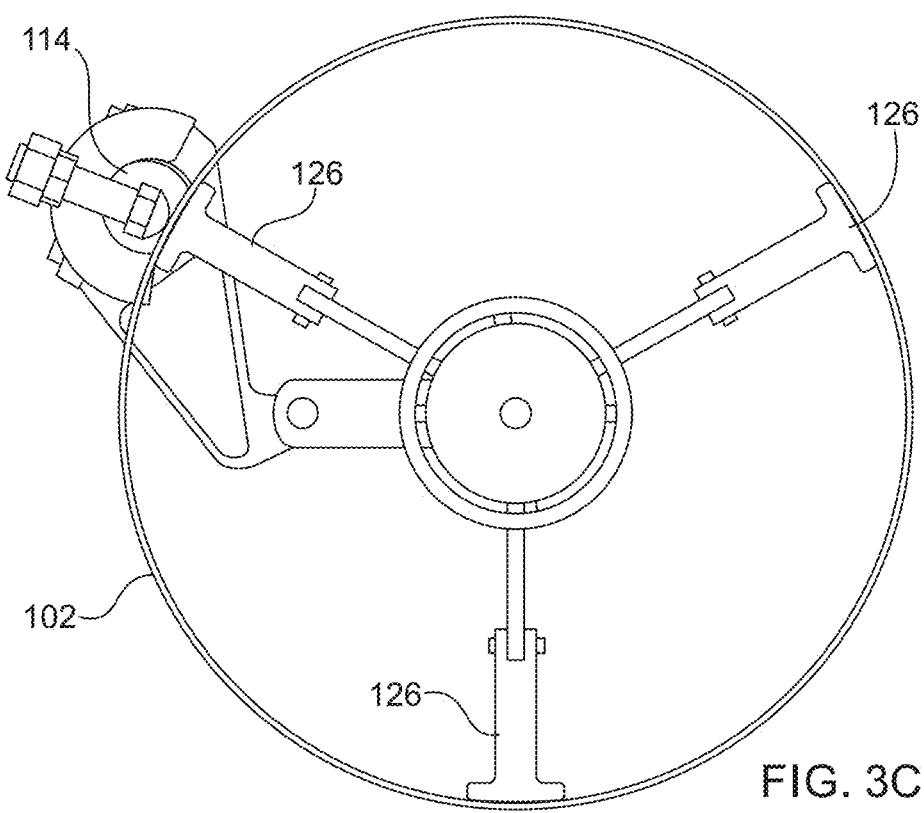
FIG. 3C shows an embodiment of a mandrel assembly with a second embodiment of a shoe.

It is contemplated for the tool 100 to be used to perform work on pipe 102 having diameters ranging from 3 inches to 8 inches. Thus, the jaws 122 of the mandrel assembly 112 are adjusted to extend radially inward and radially outward from the shaft 116 via a range of motion that is from 3 inches to 8 inches. In some embodiments, the shoes 126 are interchangeable. This facilitate placing thicker or thinner shoes 126 on the first and second legs 124', 124", depending on operating conditions (e.g., pipe diameter). Using thicker shoes 126 allows the tool 100 to be used for pipe 102 with inner diameters ranging from 3 inches to 12 inches. FIG. 3A shows an embodiment of the mandrel assembly 112 having a set of thinner shoes 126 attached to the legs 124 and a set of thicker shoes 126 that may be used to replace the thinner shoes 126. FIG. 3B illustrates the ability to use the mandrel assembly 112, with thinner shoes 126, on an 8-inch diameter pipe 102. FIG. 3C illustrates the ability to use the mandrel assembly 112, with thicker shoes 126, on a 12-inch diameter pipe 102.

As will be explained in detail later, the tool 100 is used to perform work on a pipe 102 that is already in-place (e.g., a pipe that is installed on a ship). The pipe 102 is in a vertical position, horizontal position, or an obtuse or acute angle with respect to horizontal, or in a compromising position (e.g., in a tight spot, above a user's head, in a crawl-space, etc.). The tool 100, due to the mandrel assembly 112 configuration, supports most if not all of its own weight and props the tool 100 is a proper position to ensure that a proper, clean, and uniformly profiled cut is achieved. It will be further explained that the tool 100 allows a user to manually actuate the arm assembly 130 for a more controlled operation of the tool 100. The ability to manually actuate the arm assembly 130 further reduces or eliminates the need for additional equipment to operate the tool 100 (e.g., there is no need to mechanically operate the arm assembly 130), as well as reduces the complexity and bulkiness of the tool 100. The lightweight and maneuverability of the tool 100 allows a user to easily perform work on a pipe 102, regardless of the compromising position of the pipe 102.

As noted above, and will be explained in detail later, the mandrel assembly 112 is structured to support a cutting apparatus 114 to facilitate performing work on the pipe 102 with the cutting apparatus 114. For example, the mandrel assembly 112 is configured to secure to at least a portion of the hollow interior 106 of the pipe 102 at or near the pipe end 108 while supporting the cutting apparatus 114 so that the cutting apparatus 114 is positioned at an exterior of the pipe 102 at or near the pipe end 108. The mandrel assembly 112 is configured to allow the cutting apparatus 114 to rotate about the shaft longitudinal axis 120. Rotating the cutting apparatus 114 about the shaft longitudinal axis 120 facilitate performing work on the pipe 102.

As noted above, the work performed is a straight cut, a beveled cut, etc. Also noted above is the ability to secure the mandrel assembly 112 such that the shaft longitudinal axis 120 is coaxial with the pipe longitudinal axis 110. Thus, the mandrel assembly 112 facilitates making a straight cut by causing the cutting apparatus 114 to rotate about the shaft longitudinal axis 120 such that the profile of cutting apparatus' 360-degree revolution is perpendicular to the shaft longitudinal axis 120. This allows the cutting apparatus 114 to cut the pipe end 108 such that a top surface of the newly cut edge of the straight cut all the way around the circumference of the pipe 102 sidewall is perpendicular to the shaft longitudinal axis 120. The mandrel assembly 112 facilitates making a beveled cut by causing the cutting apparatus 114 to rotate about the shaft longitudinal axis 120 such that the profile of cutting apparatus' 360-degree revolution is perpendicular to the shaft longitudinal axis 120. This allows the cutting apparatus 114 to cut the pipe end 108 such that a top surface of the newly cut edge of the beveled cut all the way around the circumference of the pipe 102 sidewall is not normal (e.g., at an obtuse or acute angle relative to) to the shaft longitudinal axis 120. The mandrel assembly 112 facilitates making a rounded cut by causing the cutting apparatus 114 to rotate about the shaft longitudinal axis 120 such that the profile of cutting apparatus' 360-degree revolution is perpendicular to the shaft longitudinal axis 120. This allows the cutting apparatus 114 to cut the pipe end 108 such that a top surface of the newly cut edge of the rounded cut all the way around the circumference of the pipe 102 sidewall is arcuate or convex to the shaft longitudinal axis 120. The mandrel assembly 112 facilitates making a j-bevel cut by causing the cutting apparatus 114 to rotate about the shaft longitudinal axis 120 such that the profile of cutting apparatus' 360-degree revolution is perpendicular to the shaft longitudinal axis 120. This allows the cutting apparatus 114 to cut the pipe end 108 such that a top surface of the newly cut edge of the rounded cut all the way around the circumference of the pipe 102 sidewall is partially normal to and partially not normal to the shaft longitudinal axis 120 (e.g., forming a bevel leading to a step).

Figure 4:
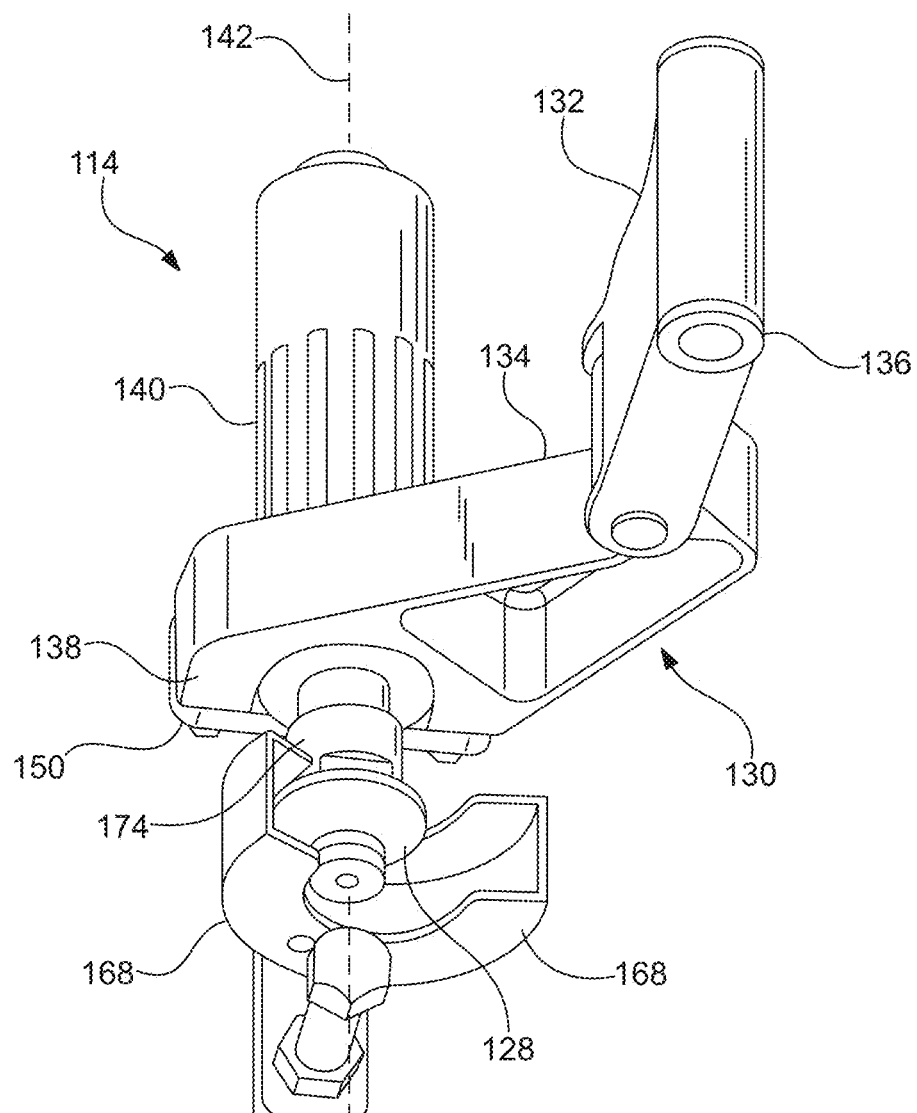
FIG. 4 is an embodiment of an arm assembly that may be used with an embodiment of the tool.

As will be explained in more detail below, the straight cuts, beveled cuts, rounded cuts, etc. are achieved by using different cutting heads 128 (see FIG. 4) of the cutting apparatus 114. It will also be explained that the tool 100 allows a user to easily switch out cutting apparatuses 114 while the mandrel assembly 112 and/or the arm assembly 130 remains intact. For instance, after the mandrel assembly 112 is attached to the pipe 102, a user can perform a cut on the pipe 102 with a first cutting apparatus 114, switch out the first cutting apparatus 114 and replace it with a second cutting apparatus 114 and perform a bevel. This is done seamlessly without disengaging the mandrel assembly 112 from the pipe 102. For instance, the cutting apparatus 114 of the arm assembly 130 is simply interchanged without removing the mandrel assembly 112 or the arm assembly 130. In addition, or in the alternative, the entire arm assembly 130 is removed (while the mandrel assembly 112 is still engaged with the pipe 102) to achieve different types of work on the pipe 102. For instance, there is a first arm assembly 130 with the first cutting apparatus 114 and a second arm assembly 130 with the second cutting apparatus 114. Instead of interchanging the cutting apparatuses 114, a user can simply interchange the arm assemblies 130.

At any time before, during, or after work is being performed on the pipe 102, the mandrel assembly 112 may be repositioned. This is achieved by rotating the shaft 116 to cause the jaws 122 to move radially inward towards the shaft 116. This causes each of the jaws 122 and/or each of the shoes 126 of a jaw 122 to break contact with the sidewall inner surface 104a of the pipe 102, or at least reduce the pressure applied by of each of the jaws 122 and/or each of the shoes 126 of a jaw 122 against the inner sidewall inner surface 104a of the pipe 102 to provide some play and movement of the mandrel assembly 112 relative to the pipe 102. The mandrel assembly 112 is then moved along the pipe longitudinal axis 110 and/or moved transverse to the pipe longitudinal axis 110. This includes moving the mandrel assembly 112 towards or away from the pipe end 108. This includes moving the mandrel assembly towards the pipe end 108 so as to remove the mandrel assembly 112 from the interior 106 of the pipe 102. One the mandrel assembly 112 has been repositioned to a desired location (unless it has been removed from the interior 106 of the pipe 102), the mandrel assembly 112 is re-secured firmly to the pipe 102. This is achieved by rotating the shaft 116 to cause the jaws 122 to extend radially away from the shaft 116 until each of the jaws 122 and/or each of the shoes 126 of a jaw 122 make contact with the inner surface 104a of the pipe 102. The shaft 116 is further rotated to cause each of the jaws 122 and/or each of the shoes 126 of a jaw 122 to press against the inner sidewall inner surface 104a of the pipe 102.

Referring to FIGS. 4-9, the mandrel assembly 112 includes an arm assembly 130. The arm assembly 130 is a structure extending from a portion of the shaft 116. For example, the arm assembly 130 is configured to rotatingly engage the shaft 116 at or near the shaft first end 116a via a free rotating engagement. For example, the arm assembly 130 includes an arm first end 132 and an arm second end 134. The arm first end 132 includes an arm aperture 136 through which the shaft first end 116a is inserted. The arm first end 132 includes a bearing assembly or a race assembly to facilitate free rotation of the arm first end 132 about the shaft 116. The bearing assembly or a race assembly is within the arm aperture 136. The arm second end 134 is configured to receive and temporarily retain the cutting apparatus 114. For example, the arm second end 134 includes a receptacle 138 (e.g., a cut out) configured to receive the cutting apparatus 114. A fastener 150 (e.g., clamp or nut) is used to secure the cutting apparatus 114 within the receptacle 138. The receptacle 138 is configured to position the cutting head 128 of the cutting apparatus 114 at a predetermined distance from the shaft longitudinal axis 120. This predetermined distance is a distance that would allow the cutting head 128 of the cutting apparatus 114 to make contact with the sidewall outer surface 104b of the pipe 102 after the mandrel assembly 112 is inserted into the interior 106 of the pipe 102. For example, it is contemplated for the tool 100 to be used to perform work on pipe 102 having diameters ranging from 3 inches to 12 inches. Thus, the predetermined distance can range from 3 inches to 12 inches. In some embodiments, the arm assembly 130 is adjustable to allow articulated motion of the cutting apparatus 114 toward and away from the shaft 116. While it is contemplated for some embodiments to facilitate articulated motion so as to allow the cutting head 128 to move radially inward to make contact with the shaft 116 (provided no pipe 102 is in the path), the range of motion would allow the cutting head 128 of the cutting apparatus 114 to make contact with the sidewall outer surface 104b of the pipe 102 after the mandrel assembly 112 is inserted into the interior 106 of the pipe 102. Thus, the range of motion of the cutting head 128 to and from the shaft 116 is from 0 inches to 12 inches. The receptacle 138 and the range of motion allows for positioning the cutting head 128 of the cutting apparatus 114 at a predetermined distance from the shaft 116 so that the cutting head 128 is off-set from the shaft longitudinal axis 120 and/or the pipe longitudinal axis 110 but also allow the cutting head 128 of the cutting apparatus 114 to make contact with the sidewall outer surface 104b of the pipe 102 after the mandrel assembly 112 is inserted into the interior 106 of the pipe 102.

The position of the arm assembly 130 extending from the shaft first end 116a and the receptacle 138 configuration is such that the cutting head 128 of the cutting apparatus 114 does not extend beyond any portion of a jaw 122 and/or a shoe 126 of a jaw 122 when the jaws 122 are caused to fully extend outward from the shaft longitudinal axis 120. This prevents the cutting head 128 from making contact with a jaw 122 and/or a shoe 126 of a jaw 122 when the cutting apparatus 114 is used to cut through a portion of the pipe 102 and the mandrel assembly 112 is secured to the pipe 102 via the jaws 122 pressing against the sidewall inner surface 104a. For example, in some embodiments, it is contemplated for the tool 100 to be used to cause the cutting head 128 to cut through at least a portion of the pipe 102 from the sidewall outer surface 104b to the sidewall inner surface 104a as the mandrel assembly 112 is secured to the pipe 102 and as the mandrel assembly 112 supports the cutting apparatus 114. With the mandrel assembly 112 configured such that the cutting head 128 does not extend beyond any portion of a jaw 122 and/or a shoe 126 of a jaw 122 when the jaws 122 are caused to fully extend outward from the shaft 116, the cutting head 128 cuts through any portion of the pipe 102 without making contact with any portion of a jaw 122 and/or a shoe 126 of a jaw 122 while the mandrel assembly 112 is secured to the pipe 102. One way to achieve this is use of a mechanical stop 164 (see FIG. 10) on the shaft 116 that prevents the arm assembly 130 from sliding towards the shaft second end 116*b* too far. The mechanical stop 164 will be explained in more detail later. In addition, or in the alternative, the arm assembly 130 is configured to retain the cutting apparatus 114 at a position such that the cutting head 128 does not extend beyond any portion of a jaw 122 and/or a shoe 126 of a jaw 122 when the jaws 122 are caused to fully extend outward from the shaft 116. The length and size of the cutting apparatus 114 can vary so the arm assembly 130 configuration to achieve this can depend on the length and size of the cutting apparatus 114.

The tool 100 is configured to retain the cutting apparatus 114 in a salutary, ergonomic position to facilitate operation of the tool 100 by a human operator. For example, the mandrel assembly 112 is secured to the pipe 102 and prop the cutting apparatus 114 in a position to facilitate performing work on the pipe 102 around an entire circumference of a section of the pipe while the engagement between the mandrel assembly 112 and the pipe 102 supports the weight of the tool 100. In this regard, the pipe 102 is made to bear the weight of the tool 100 (or at least a majority of it) due to the securement of the mandrel assembly 112 to the interior 106 portion of the pipe 102. An operator operates the cutting apparatus 114 and manually advances the cutting apparatus 114 to any position about a circumference of the pipe 102 by causing the arm assembly 130 to revolve around the shaft 116 while the mandrel assembly 112 and arm assembly 130 configurations transfer the moments and other loads to the pipe 102 to reduce or eliminate the need of the operator to stabilize the cutting apparatus 114.

In addition, the mandrel assembly 112 and arm assembly 130 configurations retains the cutting apparatus 114 in a desired orientation so as to facilitate generating a proper cut around the circumference of the pipe 102. For example, the cutting apparatus 114 includes a housing 140 having a motor in mechanical connection with a rotating cutting head 128. The rotating cutting head 128 is a planar object, such as a disk or rotary bit that is configured to rotate about the housing longitudinal axis 142 such that a geometric plane perpendicular to the rotational axis of the cutting head 128 is perpendicular to the housing longitudinal axis 142. The manner in which the arm assembly 130 extends from the shaft 116 and the configuration of the receptacle 138 is such that the housing longitudinal axis 142 is parallel with the shaft longitudinal axis 120. This ensures that the geometric plane perpendicular to the rotational axis of the cutting head 128 is perpendicular to the shaft longitudinal axis 120. With such a configuration, the geometric plane perpendicular to the rotational axis of the cutting head 128 is perpendicular to the pipe longitudinal axis 110 when the tool 100 is secured to the pipe 102. This facilitate a proper cut when the cutting apparatus 114 is caused to perform work on the pipe 102 and moved around a circumference of the pipe 102 by the cut creating a newly cut edge that is uniform all the way around the circumference of the pipe 102 and square with the pipe longitudinal axis 110. The uniformity is achieved by the tool 100 maintaining a fixed orientation of the cutting head 128 relative to the shaft longitudinal axis 120 and/or the pipe longitudinal axis 110 (e.g., the geometric plane perpendicular to the rotational axis of the cutting head 128 is perpendicular to the shaft longitudinal axis 120 and/or the pipe longitudinal axis 110) as the cutting apparatus 114 is caused to rotate about the shaft 116, or move around the circumference of the pipe 102.

The tool 100 also facilitates performing work on a pipe 102 within compromising spaces. For example, it is contemplated for the tool 100 to be used on pipes 102 that are already in place and are in use (e.g., a pipe within a ship). The pipe 102 need not be removed from its place when being worked on. Thus the pipe 102 is worked on, even though the pipe 102 may be in a compromising space. With the bulk of the tool 100 being inserted into the interior 106 of the pipe 102, the tool 100 is used to perform work on the pipe 102 with as little as 3 inches of space around the pipe sidewall outer surface 104*b*. Thus, the arm assembly 130 and the cutting apparatus 114 are rotated around the circumference of the pipe 102 to perform work on the pipe 102 while none of the arm assembly 130 or the cutting apparatus 114 extends beyond 3 inches from the pipe sidewall outer surface 104*b*.

Figure 5:
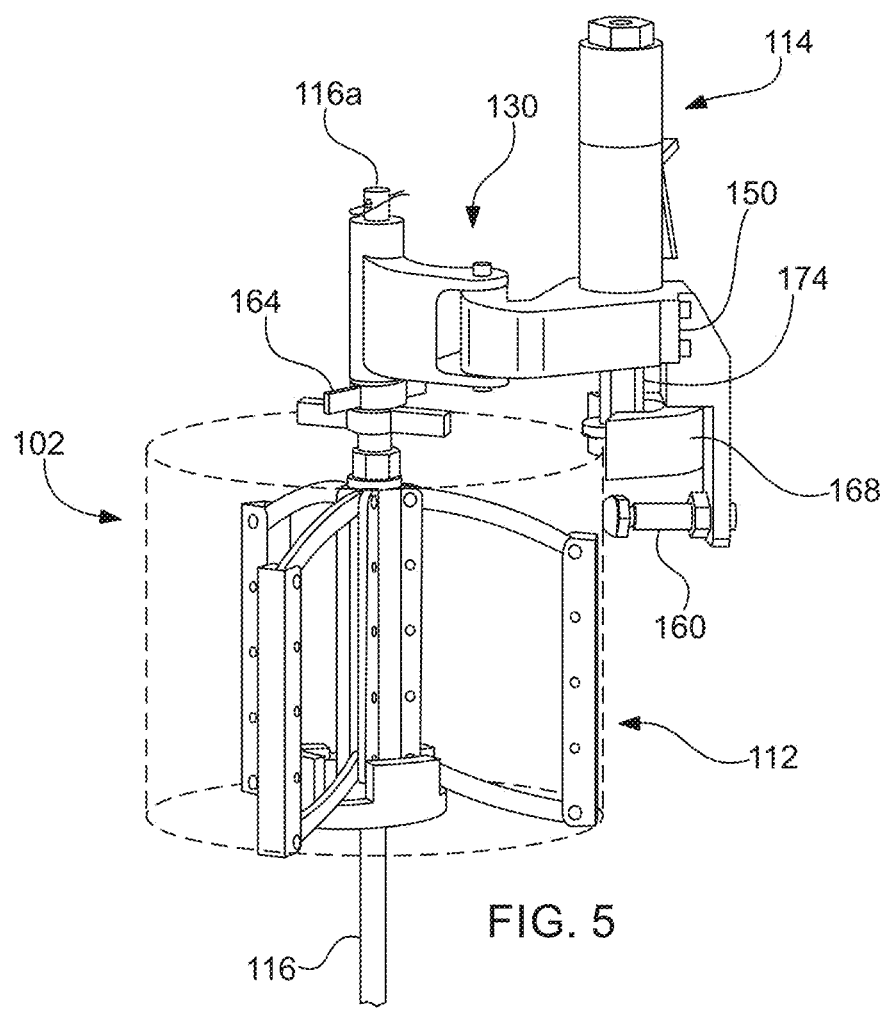
FIG. 5 is another embodiment of an arm assembly that may be used with an embodiment of the tool.
Figure 6:
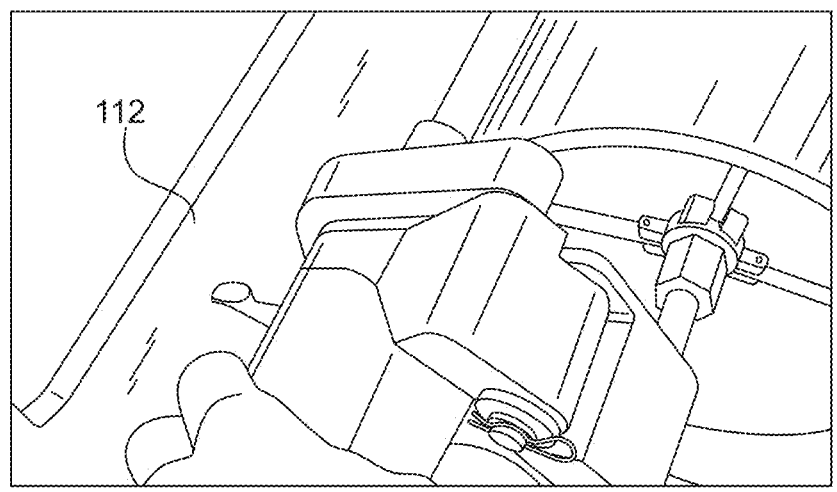
FIG. 6 shows an embodiment of an arm assembly having an adjuster to selectively prevent movement of a portion of the arm assembly.

As seen in FIG. 5, embodiments of the arm assembly 130 include a first arm section and a second arm section. The first arm section can be the arm first end 132 and the second arm section can be the arm second end 134. The arm first end 132 includes an arm aperture 136 through which the shaft first end 116*a* is inserted. The arm first end 132 includes a bearing assembly or a race assembly to facilitate free rotation of the arm first end 132 about the shaft 116. The arm second end 134 is configured to receive and temporarily retain the cutting apparatus 114. For example, the arm second end 134 includes a receptacle 138 (e.g., a cut out) configured to receive the cutting apparatus 114. A fastener 150 (e.g., clamp or nut) is used to secure the cutting apparatus 114 within the receptacle 138. In some embodiments, the first arm section is rotatingly attached to the second arm section via a free rotating engagement. For example, the two arms is connected via a bearing assembly or a race assembly to facilitate free rotation of the first arm section relative to the second arm section. The rotation is about an axis that is parallel to the shaft longitudinal axis 120 so as to allow the second arm section to be freely articulated to and from the shaft 116 while the first arm section is held in place by its connection with the shaft 116. The rotating engagement between the first arm section and the second arm section includes an adjuster to temporarily stop the rotation of the second arm section relative to the first arm section (see FIG. 6). The adjuster includes a lever tensioner stop or some other kind of mechanical arresting device. Articulating the second arm section causes the cutting apparatus 114 to move towards or away from the shaft longitudinal axis 120 (or move the cutting apparatus 114 towards or away from the pipe longitudinal axis 110 when the tool 100 is secured to the pipe 102). Once in a desired position, the adjuster is tightened to secure the second arm section (or the cutting apparatus 114 if it is attached thereto) in that position. This allows the cutting head 128 to be positioned at a desired distance from the shaft longitudinal axis 120 (or be positioned at a desired distance from the pipe longitudinal axis 110 when the tool 100 is secured to the pipe 102). This is done to facilitate performing work on different pipes 102 with the same tool 100, wherein each has different outer diameters.

Figure 7A:
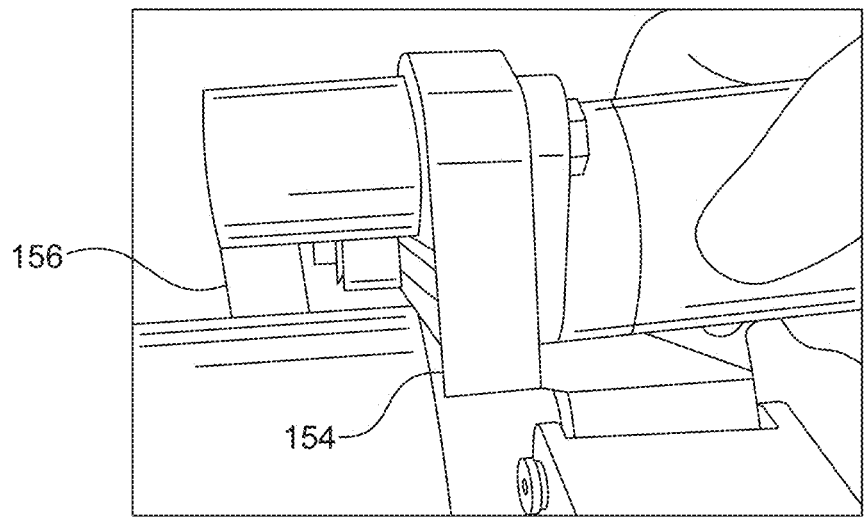
FIG. 7A shows one view of another embodiment of an arm assembly that may be used with an embodiment of the tool.
Figure 7B:
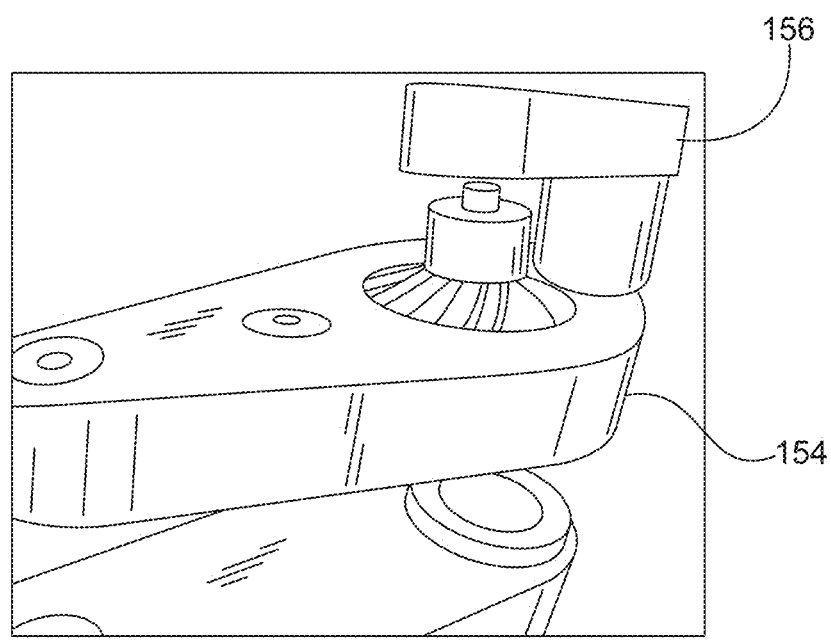
FIG. 7B shows another view of the embodiment of an arm assembly that may be used with an embodiment of the tool.

In some embodiments, the second arm section is in a form of a platen 154, or have a platen 154 attached to a portion of the second arm section (see FIGS. 7A-7B). The platen 154 is structured to rest upon an edge of the pipe end 108 when the tool 100 is secured to the pipe 102. As the cutting apparatus 114 is caused to rotate about the shaft longitudinal axis 120 (or revolve around a circumference of the pipe 102), the platen 154 is caused to ride along the edge of the pipe end 108. The platen 154 is used to assist in stabilizing the tool 100 and transfer loads in a desired way.

In some embodiments, the second arm section, with or without is having a platen 154 or with or without being formed as a platen 154, includes a leading guide 156. The leading guide 156 is attached to a distal end of the second arm section. The leading guide 156 is a member extending from the distal end of the second arm section and configured to extend beyond the cutting head 128 to partially envelop a portion of the cutting head 128. As the cutting apparatus 114 is caused to rotate about the shaft longitudinal axis 120 (or revolve around a circumference of the pipe 102), the leading guide 156 is forced to make contact with the pipe sidewall outer surface 104b. This is done to maintain consistent contact between the cutting head 128 and the pipe 102 as the cutting apparatus 114 revolves around a circumference of the pipe 102 to perform work on the pipe. In some embodiments, the leading guide 156 includes an extension 158 extending from the distal end of the second arm section along the shaft longitudinal axis 120. The extension 158 has a distal end that extends beyond the cutting head 128 when the cutting apparatus is retained in the receptacle 138. The distal end of the extension 158 includes a peg 160. The peg 160 extends perpendicularly from the extension 158 so as to extend radially inward towards the shaft 116. The peg 160 is positioned to extend beyond the cutting head 128 when the cutting apparatus is retained in the receptacle 138 so that the extension 158 and the peg 160 partially envelop the cutting head 128. The peg 160 is adjustable so as to adjust the length by which the peg 160 extends radially inward towards the shaft 116. For example, the peg 160 is a threaded bolt threadingly engaged with a threaded aperture of the extension 158. Adjusting the peg 160 adjusts the distance at which the peg 160 will make contact with the pipe sidewall outer surface 104b. In other words, adjusting the peg 160 adjusts the length 161 of the portion of the peg 160 extending from the extension 158 and towards the shaft 116. (See FIGS. 11A-11B). After the tool 100 is secured to the pipe 102, the peg 160 is adjusted to a desired length 161 so as to ensure that when the cutting apparatus 114 is caused to rotate about the shaft longitudinal axis 120 (or revolve around a circumference of the pipe 102), the peg 160 is forced to make contact with the pipe sidewall outer surface 104b.

Use of the peg 160 with adjustable length 161 maintains consistent contact between the cutting head 128 and the pipe 102 as the cutting apparatus 114 revolves around a circumference of the pipe 102 to perform work on the pipe. Use of the peg 160 also facilitates adjusting a depth at which the cutting apparatus 114 makes a cut into the pipe 102. For example, adjusting the peg 160 length 161 so that the peg 160 extends more radially inward towards the shaft 116 allows for a deeper cut, and adjusting the peg 160 length 161 so that the peg 160 extends less radially inward towards the shaft 116 allows for a shallower cut. As will be explained in more detail later, there are different types of cuts. It may be desired to form a bevel only on a portion of the edge as opposed to the entire edge. Adjusting the peg 160 length 161 facilitate forming a bevel at any portion. At any time, the peg 160 length 161 is adjusted to increase or decrease the depth at which the cutting apparatus 114 makes a cut into the pipe 102.

With some methods of use, it may be desired to perform work on the pipe 102 in stages. For example, a cut on the pipe 102 may be done by making a first cut at a first depth and then a second cut at a second depth. Adjusting the peg 160 length 161 facilitates forming a cut in stages. For instance, a first cut is made at a first depth with the peg 160 length 161 set at a first length 161. A second cut is made at a second depth with the peg 160 length 161 set at a second length 161. The first length 161 is less than the second length 161, allowing the first cut to be shallower than the second cut.

Figure 8:
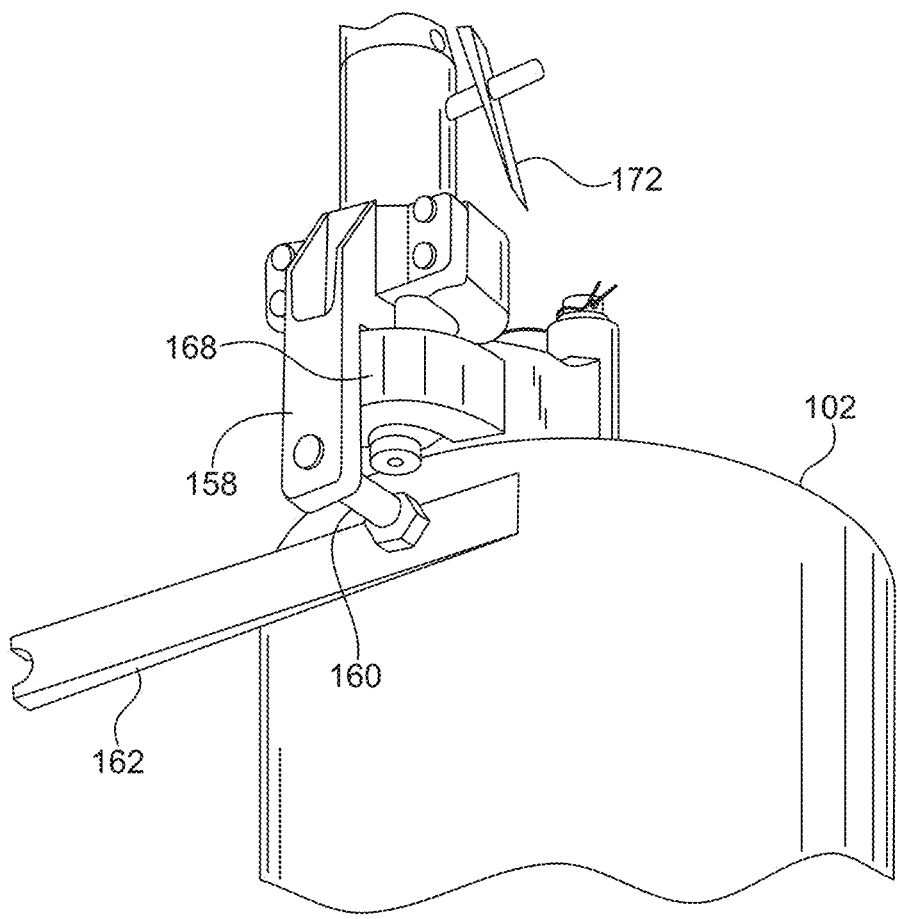
FIG. 8 shows an embodiment of the arm assembly that includes a wedge gauge.

Referring to FIG. 8, adjusting the peg length 161 to achieve a desired depth is achieved via use of a wedge gauge 162. For example, the wedge gauge 162 (annotated with wedge thicknesses along the wedge) is inserted between the peg 160 and the pipe sidewall outer surface 104b. The wedge gauge 162 is positioned to have a desired wedge thickness at a location that is between the peg 160 and the pipe sidewall outer surface 104b. The peg 160 length 161 is adjusted (moved radially inward towards the shaft 116) until the peg 160 makes contact with the wedge gauge 162. This ensures that a desired peg 160 length 161 is achieved. A calibration between the wedge gauge 162 thickness, peg length 161 and the distance at which the cutting head 128 is positioned from the shaft 116 is done to use the wedge gauge 162 as a means to set the depth of the cut. In some embodiments, the peg 160 is configured as a spindle with a metered gauge (e.g., a micrometer screw gauge) so as to provide a user with the peg 160 length 161 as the peg 160 is rotated or otherwise moved radially to or from the shaft 116.

Figure 9A:
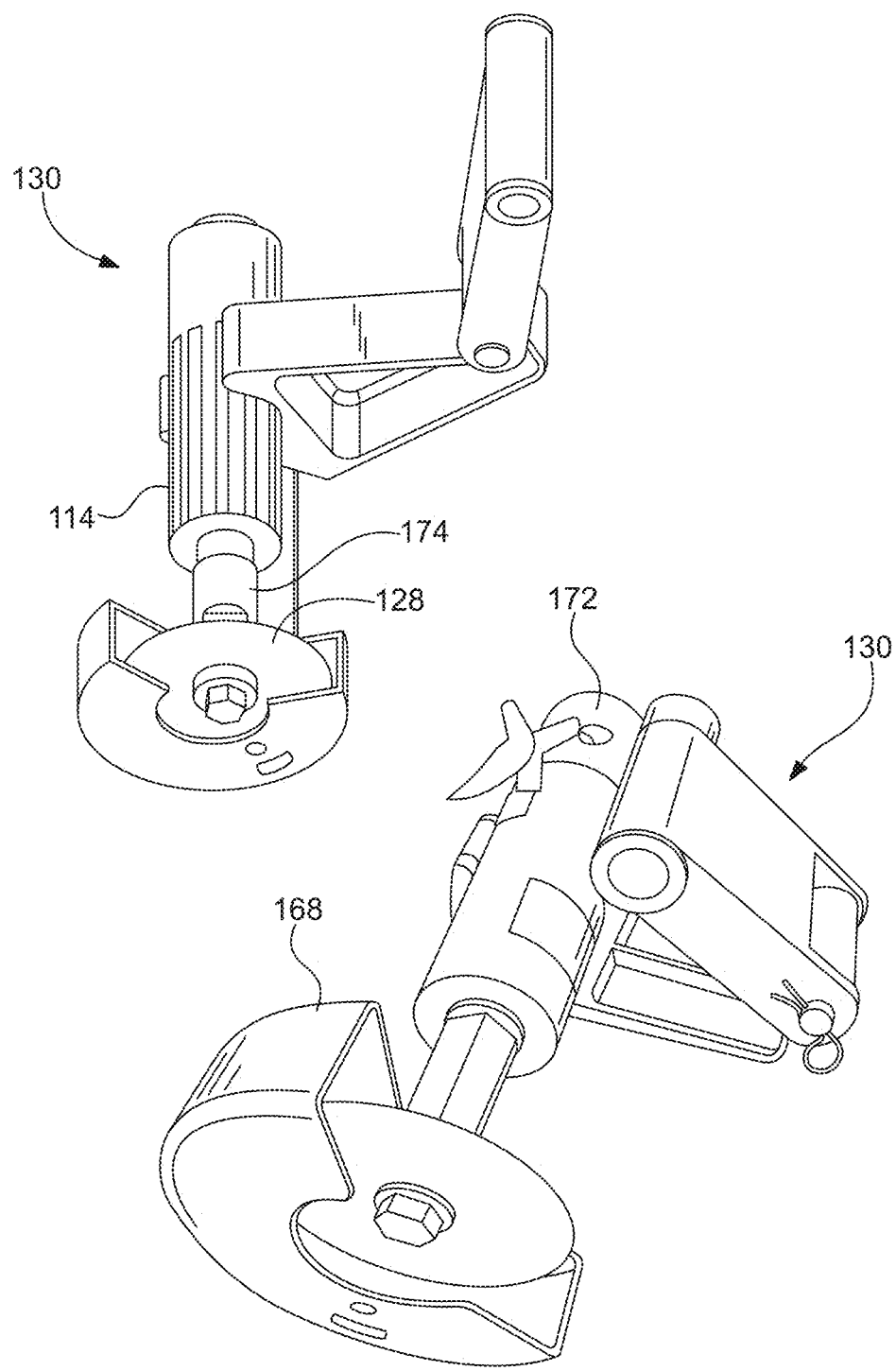
FIG. 9A shows an embodiment of the arm assembly that is used with a straight cutting head.
Figure 9B:
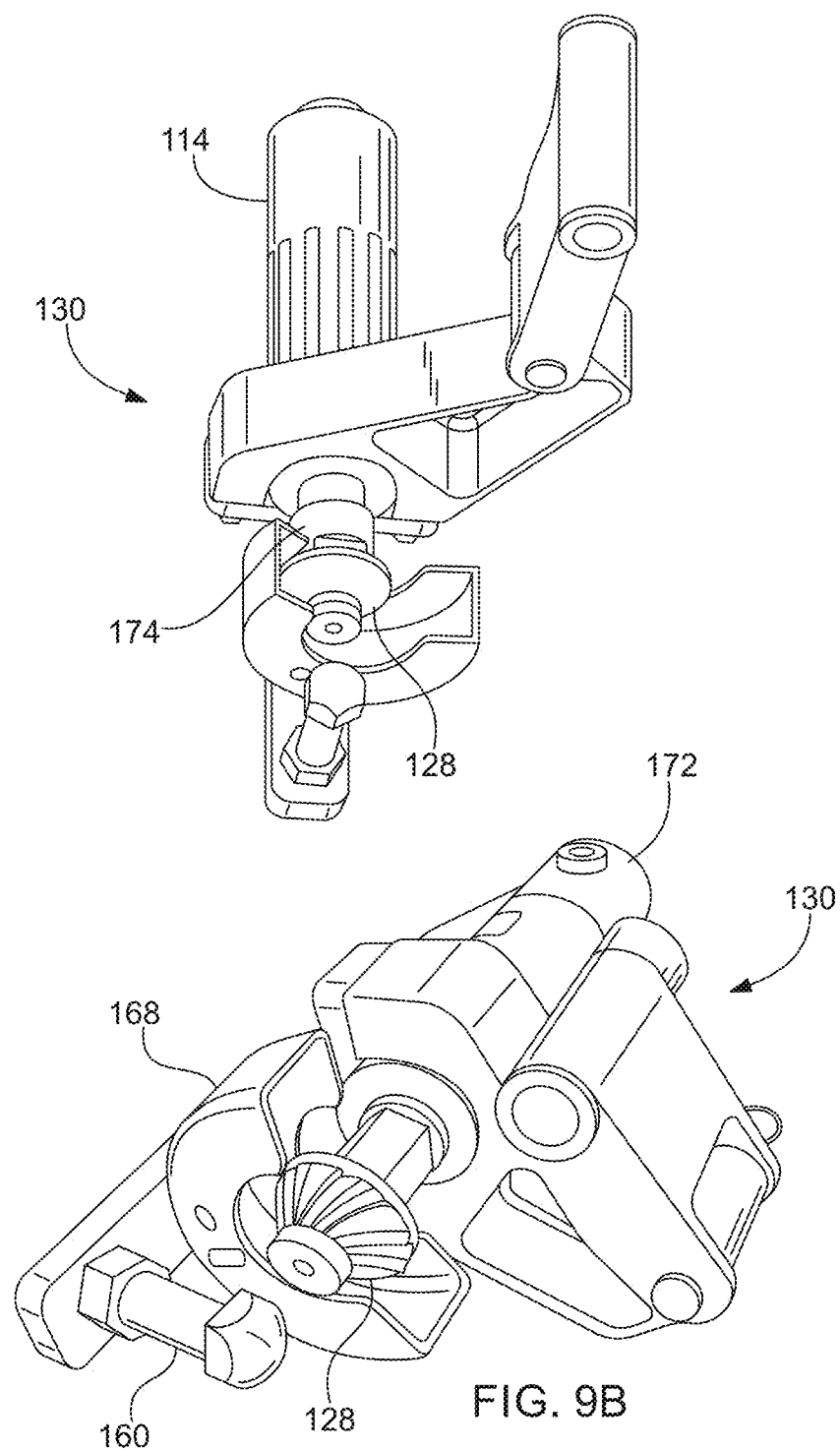
FIG. 9B shows an embodiment of the arm assembly that is used with a beveled cutting head.

Referring to FIGS. 9A and 9B, some embodiments includes dedicated arm assemblies 130 for performing predetermined types of work. For example, there is a straight cut arm assembly 130, a beveled cut arm assembly 130, a rounded cut arm assembly 130, a j-bevel cut arm assembly 130, etc. It is contemplated for the straight cut to require a cutting head 128 that is larger (e.g., larger in diameter) than the cutting head 128 to perform the beveled cut, rounded cut, and j-bevel cut. Thus, the cut arm assembly 130 for performing a straight cut should be able to retain the cutting apparatus 114 at a distance away from the shaft 116 that is greater than the distance the cut arm assembly 130 for performing the other cuts needs to be. It is therefore contemplated to have two types of cut arm assemblies: 1) a straight cut arm assembly 130 (see FIG. 9A); 2) a cut arm assembly 130 for the other type of cuts (see FIG. 9B). The straight cut arm assembly 130 should have an arm first end 132 and an arm second end 134 that is long enough to accommodate the larger diameter cutting head 128 for performing straight cuts. The arm assembly 130 for the other type of cuts should have an arm first end 132 and an arm second end 134 that is shorter than that of the straight cut arm assembly 130, but long enough to accommodate the smaller diameter cutting heads 128 for performing the other types of cuts (see FIGS. 11A-11B). A user then easily switches to and from the two types of cut arm assemblies 130 by merely decoupling one from the shaft 116 of the mandrel assembly 112 and coupling the other one thereto (while the mandrel assembly 112 remains engaged with the pipe 102). For example, a user uses the straight cut arm assembly 130 to make a straight cut in the pipe 102 and remove a section of the pipe end 108 that was just cut. A user then replaces the straight cut arm assembly 130 with the arm assembly 130 for the other type of cuts. A user may adjust the positioning of the mandrel assembly 112 and the leading guide 156 accordingly, and perform work on the newly cut edge of the pipe end 108 to generate a beveled edge, a rounded edge, a j-beveled edge, etc. In addition, or in the alternative, the entire arm assembly 130 is removed (while the mandrel assembly 112 is still engaged with the pipe 102) to achieve different types of work on the pipe 102.

Figure 10:
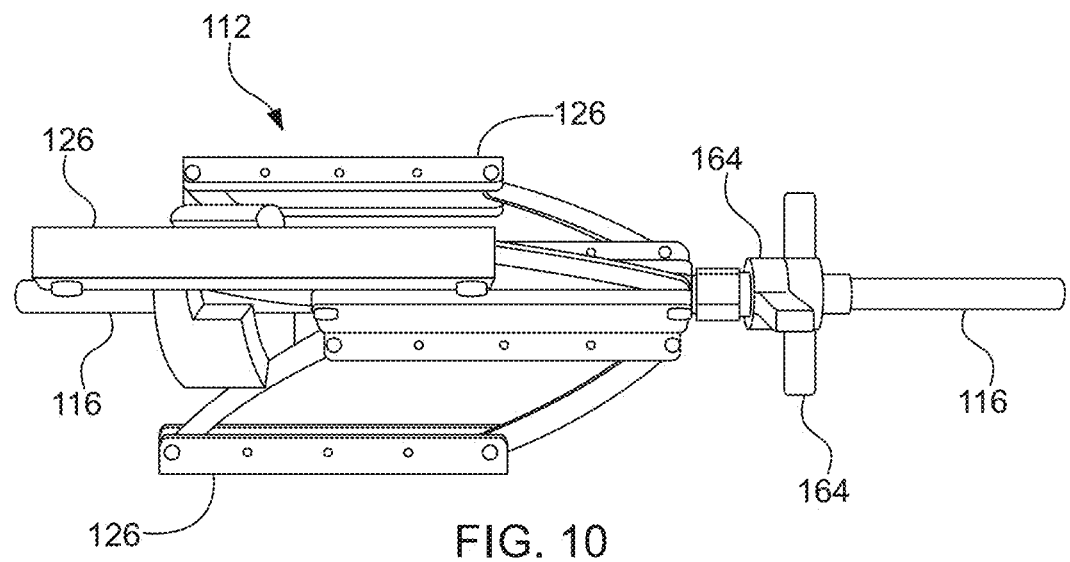
FIG. 10 shows an embodiment of a mechanical stop that is used with an embodiment of the mandrel assembly.

Referring to FIG. 10, in at least one embodiment, the mandrel assembly 112 includes a mechanical stop 164. The mechanical stop 164 is positioned on a portion of the shaft 116. The mechanical stop 164 is positioned at a location between the shaft first end 116a and the hub 118. The mechanical stop 164 is fixed or adjustable. For example, the mechanical stop 164 is fixed at a distance along the shaft longitudinal axis 120 or it is moved to a desired distance along the shaft longitudinal axis 120. The mechanical stop 164 is a flat or some other structure disposed on the shaft 116. The mechanical stop 164 is a nut threadingly engaged with the shaft 116. The mechanical stop 164 is two wing nuts (or two flats) threadingly engaged with the shaft 116. The mechanical stop 164 is used to prevent the arm assembly 130 from sliding along the shaft 116 beyond the mechanical stop 164. For example, the arm first end 132 aperture 136 is large enough to allow traverse motion of the shaft 116 but not large enough to allow the mechanical stop 164 to slide into or through the arm aperture 136.

The adjustable mechanical stop 164 is used to set a desired position of the arm assembly 130 relative to an end 116a, 116b of the shaft 116. For example, the mechanical stop 164 is moved towards the shaft first end 116a to cause the arm assembly 130 to rest in a position that is more proximal to the shaft first end 116a. The mechanical stop 164 is moved towards the shaft second end 116b to cause the arm assembly 130 to rest in a position that is more proximal to the shaft second end 116b. This is done to adjust the distance at which the cutting head 128 extends along the shaft longitudinal axis 120 when the cutting apparatus 114 is secured in the receptacle 138. For example, it is contemplated for the tool 100 to be used to perform work on a pipe end 108 of a pipe 102. It may be desired to perform the work at a predetermined distance on the pipe 102 along the pipe longitudinal axis 110. For example, a straight cut is performed on the pipe 102 to cut a portion of the pipe's 102 top from the pipe end 108. Thus, a straight cut is made at a predetermined distance from the edge 109 of the pipe 102 and all the way around the circumference of the pipe 102 so as to remove a portion of the pipe 102. This facilitate cutting and removing a portion of the pipe 102. In one form, the removed portion can range up to 3 inches. Of course, one skilled in the art will realize other lengths can be implemented. Adjusting the distance at which the cutting head 128 extends along the shaft longitudinal axis 120 when the cutting apparatus 114 is secured in the receptacle 138 and the mandrel assembly 112 is secured to the pipe 102 adjusts the distance at which the cutting head 128 extends along the pipe longitudinal axis 110 when the mandrel assembly 112 is secured to the pipe 102 and is used to support the cutting apparatus 114 when performing work on the pipe 102.

The mechanical stop 164 prevents the arm assembly 130 from traversing the shaft 116 along the shaft longitudinal axis 120 so that the arm assembly 130, and the cutting apparatus 114, are fixed (or at least temporarily fixed) at a distance along the shaft longitudinal axis 120. When the tool 100 is secured to the pipe 102, the mechanical stop further facilitates a proper cut when the cutting apparatus 114 is caused to perform work on the pipe and moved around a circumference of the pipe 102 by the cut creating a newly cut edge having a profile all the way around the circumference of the pipe 102 sidewall is perpendicular to the pipe longitudinal axis 110. Thus, the mechanical stop 164 ensures that the cut is "square" with the pipe longitudinal axis 110 by not allowing the arm assembly 130, and thus cutting head 128, to move along the shaft longitudinal axis 120 (or along the pipe longitudinal axis 110 when the tool 100 is secured to the pipe 102 during a cutting operation). Use of the mechanical stop 164 obviates the need to mark cut lines on the pipe 102 to use as a guide or use pipe squares to confirm that the pipe cut is square. This saves on time and reduces error.

As noted above, the mechanical stop 164 is used to maintain the distance at which the cutting head 128 extends along the shaft longitudinal axis 120 when the cutting apparatus 114 is secured in the receptacle 138 and/or the pipe longitudinal axis 110 when the tool is secured to the pipe 102. As a non-limiting example, when the embodiment of the arm assembly 130 having the platen 154 and leading guide 156 is used, the leading guide 156 may ensure that the cut is consistent laterally (e.g., prevent the cutting head 128 from moving inward towards the pipe longitudinal axis 110 to generate a consistent cut depth), but the platen's 154 position may change longitudinally (e.g., move along the pipe longitudinal axis 110) because it rides along the pipe edge as the edge is being cut. However, use of the mechanical stop 164 prevents this longitudinal movement. It should be noted that some embodiments do not require use of a platen 154 at all. In any embodiment, the mechanical stop 164 is used to maintain the distance at which the cutting head 128 extends along the shaft longitudinal axis 120 when the cutting apparatus 114 is secured in the receptacle 138 and/or the pipe longitudinal axis 110 when the tool is secured to the pipe 102.

It should be noted that the tool 100 is contemplated for use on pipes 102 that are positioned vertically, horizontally, or at any orientation there-between. In some embodiments, the shaft first end 116a includes an attachment 166 to facilitate temporarily securing a lanyard or some other type of tether thereto (see FIG. 2). The attachment 166 is a cotter pin, clip, an eyelet, a shackle, etc. A lanyard is used to tether the mandrel assembly 112 to a structure so as to prevent the mandrel assembly 112 from advancing too far into (e.g., falling into) the pipe 102. The lanyard also facilitates positioning the tool 100 while the tool 100 is inside the pipe 102 by pulling on the lanyard. For example, a user pulls on the lanyard to move the tool 100 towards the pipe end 108. As another example, a user pulls on the lanyard to pull the mandrel assembly 112 from within the pipe 102 in the event the mandrel assembly 112 inadvertently falls too far within the pipe 102.

In some embodiments, the arm second end 134 includes a shield 168. (See FIG. 4). The shield 168 extends from the second arm section, a portion of the leading guide 156, etc. The shield 168 is a structure configured to prevent shavings and debris of the pipe 102 from being expelled towards the user, to reduce the distance the shavings or debris are being expelled, and/or to contain the shavings or debris. For example, the shield 168 is an open canister shaped member that partially envelopes the cutting head 128. As the cutting head 128 performs work on the pipe 102, the shavings or debris are expelled into a cavity portion of the shield 168 to remain within the cavity portion. It is understood that all of the shavings or debris may not all remain within the cavity portion, but most of the shavings or debris will at least enter the cavity portion and either remain within the cavity portion or fall out therefrom.

In some embodiments, the tool 100 includes a cutting apparatus 114. The cutting apparatus 114 includes a housing 140 having a motor in mechanical connection with a rotating cutting head 128. The motor is pneumatic, electronic, etc. For example the cutting apparatus 114 is an Atlas Copco air motor unit, a Dotco air motor unit, etc. The rotating cutting head 128 is a planar object, such as a disk or rotary bit that is configured to rotate about the housing longitudinal axis 142 such that a geometric plane perpendicular to the rotation of the cutting head 128 is perpendicular to the housing longitudinal axis 142. The motor, when actuated, causes the cutting head 128 to rotate at a desired rotational speed. Some cutting apparatuses 114 are operated by a switch 172. Operation of the switch 172 selectively supplies compressed air or electrical power to the motor. The switch 172 may be a dead-man switch. Some embodiments includes a throttle to facilitate operator-control of the rotational speed of the cutting head 128. Operation of the throttle selectively provides a predetermined amount or rate of compressed air or electrical power, depending on the throttle setting.

The mechanical connection between the motor and the cutting head 128 is formed by an adapter 174. The adapter 174 is a securing device, such as a collet, coupler, clamp, spring loaded pin, chuck assembly, etc. that facilitates interchangeability of cutting heads 128.

The type of work performed by the cutting apparatus 114 is determined by the type of cutting head 128 used. For example, a cutting head 128 having a flat planar shape is used to generate straight cuts. Examples of flat planar shaped cutting heads 128 are 3-inch bonded Type I abrasive cutting wheels, ceramic bonded cutting wheels, aluminum oxide cutting wheels, diamond wheels, etc., which are manufactured by Blackstone, Lenox, MetalMax, 3M, Cubitron II, etc. The flat planar shape allows the cutting head 128 to cut into the pipe 102, forming a straight cut edge with a geometric plane that is perpendicular to the pipe longitudinal axis 110. A cutting head 128 may have a saucer shape. Examples of saucer shaped cutting heads 128 is 15, 22.5, 37.5, 45, 52.5, and 60 degree angle steel-cutting, non-ferrous metal-cutting, or hard material-cutting bits able to accommodate cut depths ranging from 0.25 inches to 0.5 inches (e.g., pipe sidewall thicknesses ranging from 0.25 inches to 0.5 inches), which are manufactured by Beveltools, Griton, Cubitron II, etc. The saucer shape allows the cutting head 128 to cut into the pipe 102, forming a beveled cut edge with a geometric plane that is at an angle with respect to the pipe longitudinal axis 110. The cutting head 128 may have a saucer shape leading to a straight edge. (See FIGS. 11A-11B). The saucer shape leading to a straight edge allows the cutting head 128 to cut into the pipe 102, forming a j-beveled cut edge with a geometric plane that is at an angle with respect to the pipe longitudinal axis 110 that leads to a geometric plane that is parallel to the pipe longitudinal axis 110. Other shaped cutting heads 128 may be used. For example, a commercial off the self or custom carbide cutter may be used to generate a j-bevel.

Some embodiments include a plug. The plug is a member configured to be inserted into the pipe 102. The plug is used to capture shavings or debris to prevent the shavings or debris from entering the pipe 102. For example, the plug may be tethered rod with a fluted gasket sized to fit the inner diameter of the pipe 102. When work is performed on the pipe 102, the shavings or debris fall into the plug and may be captured therein. After the work is complete and the tool 100 removed from the pipe 102, the plug is removed from the pipe 102, carrying all of the captured shavings or debris with it. The plug is removably attached to a portion of the shaft 116.

Some embodiments includes use of a washer included with the cutting apparatus 114 and/or attached to a portion of the shaft 116. The washer is an Occupational Safety and Health Administration (OSHA) approved washer.

It should be noted that a single mandrel assembly 112 is designed for use with pipes 102 having diameters within a range from 3 inches to 12 inches. Making the mandrel assembly 112 smaller is done to accommodate use with pipes 102 having smaller diameters (e.g., diameters outside the range from 3 inches to 12 inches). Making the mandrel assembly 112 larger is done to accommodate use with pipes 102 having larger diameters (e.g., diameters outside the range from 3 inches to 12 inches).

In at least one embodiment, a method of using the tool 100 involves facilitating performing work on a pipe 102. The mandrel assembly 112 is inserted into the pipe 102 by being slid through the pipe end 108. The pipe 102 is in-place (e.g., already installed), positioned vertically, horizontally, at an angle, in a compromising position, etc. Inserting the mandrel assembly 112 includes contracting the jaws 122 (e.g., transitioning the mandrel assembly 112 to a contracted position) and sliding the mandrel assembly 112 so that the shaft second end 116b spearheads the insertion. The jaws 122 of the mandrel assembly 112 are caused to move radially outward to engage the sidewall inner surface 104a of the pipe 102 by transitioning the mandrel assembly 112 to an expanded position. As the mandrel assembly 112 is transitioned from the contracted position to the expanded position, the shoes 126 of the jaws 122 remain parallel with the mandrel shaft 116 (and the sidewall inner surface 104a of the pipe 102, provided the pipe longitudinal axis 110 and the mandrel shaft longitudinal axis 120 are aligned or co-axial). This causes the mandrel assembly 112 to secure to the interior 106 of the pipe 102. The mandrel assembly 112 is then used to provide securement to the pipe 102 and support the cutting apparatus 114. This is achieved by coupling an arm assembly 130 to the mandrel assembly 112. The cutting apparatus 114 is then attached to the arm assembly 130. The mechanical stop 164 is adjusted to position the cutting head 128 of the cutting apparatus 114 at a desired location along the pipe longitudinal axis 110. The method involves performing a cut on the pipe 102. This includes performing a straight cut, beveled cut, rounded cut, j-bevel cut, etc. The cut is achieved by actuating the cutting apparatus 114 to cause the cutting head to rotate and by causing the cutting apparatus 114 to revolve around the circumference of the pipe 102, either partially around the circumference or all the way around the circumference. This is a manual movement of the arm assembly 130 about the shaft 116. The cut is done in stages. For example, a cut on the pipe 102 may be done by making a first cut at a first depth, then a second cut at a second depth, etc. Adjusting the peg 160 length facilitate forming each cut at different depths in stages by causing the cutting head 128 to cut deeper and deeper into the pipe 102.

In some embodiments, the method involves securing a straight cut arm assembly 130 first and performing a straight cut on the pipe 102. This includes using a cutting head 128 have a flat planar shape. A straight cut is defined as a cut through a sidewall of the pipe 102 all the way around the circumference of the pipe 102 so that the newly cut edge forms the terminus of the pipe end 108. Again, the straight cut is performed in stages. The straight cut arm assembly 130 is replaced with the arm assembly 130 for the other type of cuts. In addition or in the alternative, after the mandrel assembly 112 is attached to the pipe 102, a user may perform a cut on the pipe 102 with a first cutting apparatus 114, switch out the first cutting apparatus 114 and replace it with a second cutting apparatus 114 and perform a bevel (without disengaging the arm assembly 130). If necessary, the jaws 122 of the mandrel assembly 112 are caused to move radially inward towards the shaft 116 to allow for movement of the mandrel assembly 112 relative to the pipe 102. Once mandrel assembly 112 is in a desired position (e.g., such that the cutting head 128 is in line with the newly cut edge of the pipe 102), the jaws 122 is caused to move radially outward away from the shaft 116 to secure the mandrel assembly 112 to the pipe 102. In some embodiments, the mechanical stop 164 is adjusted to allow for movement of the arm assembly 130, and thus the cutting head 128, relative to the shaft 116. This further allows causing the cutting head 128 to be in line with the newly cut edge of the pipe 102. In some embodiments, the peg 160 is adjusted to set the position the cutting head 128 of the cutting apparatus 114 at a predetermined distance from the shaft 116 and/or the pipe sidewall outer surface 104b. The cutting head 128 having a flat planar shape is replaced with the saucer shaped cutting head 128. This is done to generate a desired bevel cut on the newly cut edge of the pipe 102. The beveled cut is achieved by actuating the cutting apparatus 114 to cause the cutting head 128 to rotate and by causing the cutting apparatus 114 to revolve around the circumference of the pipe 102. The beveled cut is done in stages. For example, a beveled cut on the pipe 102 may be done by making a first cut at a first depth, then a second cut at a second depth, etc. Adjusting the peg 160 length facilitates forming a beveled cut in stages by causing the cutting head 128 to cut deeper and deeper into the pipe 102. The same process is used to generate the round cut, the j-beveled cut, etc.

After the work is performed on the pipe 102, the jaws 122 of the mandrel assembly 112 are caused to move radially inward towards the shaft 116 to allow for movement of the mandrel assembly 112. The mandrel assembly 112, along with the arm assembly 130 and the cutting apparatus 114, are removed from the pipe 102.

It should be understood that modifications to the embodiments disclosed herein are made to meet a particular set of design criteria. For instance, the number of mandrel assemblies 112, arm assemblies 130, cutting apparatuses 114, cutting heads 128, and other components can be any suitable number of each to meet a particular objective. The particular configuration of type of such elements can also be adjusted to meet a particular set of design criteria. Therefore, while certain exemplary embodiments of tools and methods of making and using the same have been discussed and illustrated herein, it is to be distinctly understood that the invention is not limited thereto but may be otherwise variously embodied and practiced within the scope of the following claims.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

We claim:

1. A mandrel assembly for pipe edge preparation, comprising:
   a shaft comprising a shaft first end and a shaft second end with a shaft longitudinal axis running from the shaft first end to the shaft second end;
   a hub rotatingly engaged with the shaft, the hub comprising a plurality of jaws, each jaw configured to extend radially from the shaft as the shaft is rotated in a first direction relative to the hub, each jaw configured to retract radially toward the shaft as the shaft is rotated in a second direction relative to the hub; and
   an arm assembly extending from the shaft at the shaft first end, the arm assembly configured to receive and retain an apparatus, wherein:
      the arm assembly comprises an arm first end and an arm second end, the arm first end comprising an arm aperture with a bearing assembly or a race assembly to facilitate free rotation of the arm first end about the shaft, the arm second end comprising a receptacle configured to receive and retain the apparatus; and
      the arm first end comprises a first arm section and the arm second end comprises a second arm section, the first arm section rotatingly engaged with the second arm section via a bearing assembly or a race assembly;
   wherein the mandrel assembly is configured to be inserted into an interior portion of the pipe via a pipe end and secure to a sidewall inner surface of the pipe by causing the plurality of jaws to extend radially from the shaft and press against the sidewall inner surface of the pipe; and
   wherein the apparatus is configured to perform work on a sidewall outer surface of the pipe at a circumferential edge of the pipe by manual rotation of the arm assembly, the work comprising cutting, grinding, abrading, or burnishing.

2. The mandrel assembly for pipe edge preparation recited in claim 1, wherein the plurality of jaws comprises a first jaw, a second jaw, and a third jaw.

3. The mandrel assembly for pipe edge preparation recited in claim 1, wherein each jaw of the plurality of jaws extend radially from the shaft in unison and retract radially toward the shaft in unison.

4. The mandrel assembly for pipe edge preparation recited in claim 1, wherein at least one jaw comprises a shoe attached to a portion thereof.

5. The mandrel assembly for pipe edge preparation recited in claim 4, wherein the shoe is pivotally attached to the at least one jaw.

6. The mandrel assembly for pipe edge preparation recited in claim 1, further comprising a mechanical stop disposed on a portion of the shaft, the mechanical stop configured to prevent movement of the arm assembly along the shaft longitudinal direction.

7. The mandrel assembly for pipe edge preparation recited in claim 6, wherein the mechanical stop comprises at least one member threadingly engaged with the shaft to facilitate adjusting a location of the mechanical stop along the shaft longitudinal axis.

8. The mandrel assembly for pipe edge preparation recited in claim 1, wherein the arm aperture is configured to facilitate slidable motion of the arm assembly with respect to the shaft.

9. The mandrel assembly for pipe edge preparation recited in claim 1, wherein the second arm section comprises a leading guide extending from a distal end of the second arm section.

10. The mandrel assembly for pipe edge preparation recited in claim 9, wherein the leading guide comprises a shield.

11. The mandrel assembly for pipe edge preparation recited in claim 10, wherein the shield comprises an open canister shaped member.

12. A mandrel assembly for pipe edge preparation, comprising:
    a shaft comprising a shaft first end and a shaft second end with a shaft longitudinal axis running from the shaft first end to the shaft second end;

a hub rotatingly engaged with the shaft, the hub comprising a plurality of jaws, each jaw configured to extend radially from the shaft as the shaft is rotated in a first direction relative to the hub, each jaw configured to retract radially toward the shaft as the shaft is rotated in a second direction relative to the hub; and an arm assembly extending from the shaft at the shaft first end, the arm assembly configured to receive and retain an apparatus;

wherein the mandrel assembly is configured to be inserted into an interior portion of the pipe via a pipe end and secured to a sidewall inner surface of the pipe by causing the plurality of jaws to extend radially from the shaft and press against the sidewall inner surface of the pipe;

wherein the apparatus is configured to perform work on a sidewall outer surface of the pipe at a circumferential edge of the pipe by manual rotation of the arm assembly, the work comprising cutting, grinding, abrading, or burnishing;

wherein the arm assembly comprises an arm first end and an arm second end, the arm first end comprising an arm aperture with a bearing assembly or a race assembly to facilitate free rotation of the arm first end about the shaft, the arm second end comprising a receptacle configured to receive and retain the apparatus;

wherein the arm first end comprises a first arm section and the arm second end comprises a second arm section, the first arm section rotatingly engaged with the second arm section via a bearing assembly or a race assembly;

wherein the second arm section comprises a leading guide extending from a distal end of the second arm section; and wherein the leading guide comprises an extension extending along the shaft longitudinal axis and a peg extending radially inward towards the shaft longitudinal axis.

13. The mandrel assembly for pipe edge preparation recited in claim 12, wherein the peg comprising a threaded bolt threadingly engaged with a threaded aperture of the extension.

14. A pipe preparation tool, comprising:
a mandrel assembly, comprising:
  a shaft comprising a shaft first end and a shaft second end with a shaft longitudinal axis running from the shaft first end to the shaft second end;
  a hub rotatingly engaged with the shaft, the hub comprising a plurality of jaws, each jaw configured to extend radially from the shaft as the shaft is rotated in a first direction relative to the hub, each jaw configured to retract radially toward the shaft as the shaft is rotated in a second direction relative to the hub; and
  an arm assembly extending from the shaft at the shaft first end, the arm assembly comprising:
    an arm first end and an arm second end, the arm first end comprising an arm aperture with a first bearing assembly or a first race assembly to facilitate free rotation of the arm first end about the shaft, the arm second end comprising a receptacle configured to receive and retain a cutting apparatus configured to perform work on a pipe, the work comprising cutting, grinding, abrading, or burnishing,
      wherein the arm first end comprises a first arm section and the arm second end comprises a second arm section, the first arm section rotatingly engaged with the second arm section via a second bearing assembly or a second race assembly;

wherein the mandrel assembly is configured to be at least partially inserted into an interior portion of the pipe via a pipe end while the arm assembly positions the cutting apparatus at an exterior of the pipe; and wherein the cutting apparatus is rotated about a circumference of the pipe as the arm assembly is manually caused to revolve about the shaft, and a cutting head of the cutting apparatus makes contact with an outer surface of the pipe to generate a cut at a circumferential edge of the pipe.

15. The pipe preparation tool recited in claim 14, wherein at least one jaw comprises a shoe pivotally attached to a portion thereof.

16. A mandrel assembly for pipe edge preparation, comprising
a shaft comprising a shaft proximal end and a shaft distal end with a shaft longitudinal axis running from the shaft proximal end to the shaft distal end;
a hub rotatingly engaged with the shaft, the hub comprising a plurality of jaws, each jaw positioned equidistantly about the shaft longitudinal axis, wherein:
  each jaw comprises a first leg pivotally attached to the hub, a second leg pivotally attached to the hub, and a shoe pivotally attached to the first leg and the second leg so that the shoe of each jaw is parallel to the shaft longitudinal axis; and
  the first leg and the second leg of each jaw pivots in unison as the shaft is rotated relative to the hub, the pivoting motion of the first leg and the second leg of each jaw causing the shoe pivotally attached thereto to move radially toward or away from the shaft so that the shoe remains parallel to the shaft longitudinal axis during the movement of the shoe toward and away from the shaft; and
an arm assembly extending from the shaft at the shaft proximal end, the arm assembly configured to receive and retain apparatus, wherein:
  the arm assembly comprises an arm first end and an arm second end, the arm first end comprising an arm aperture with a bearing assembly or a race assembly to facilitate free rotation of the arm first end about the shaft, the arm second end comprising a receptacle configured to receive and retain the apparatus; and
  the arm first end comprises a first arm section and the arm second end comprises a second arm section, the first arm section rotatingly engaged with the second arm section via a bearing assembly or a race assembly;
wherein the mandrel assembly is configured to be inserted into an interior portion of the pipe via a pipe end so that the shaft distal end spearheads the insertion;
wherein the mandrel assembly is configured to secure to a sidewall inner surface of the pipe by causing the plurality of shoes to extend radially from the shaft and press against the sidewall inner surface of the pipe; and
wherein the apparatus is configured to perform work on a sidewall outer surface of the pipe at a circumferential edge of the pipe by manual rotation of the arm assembly, the work comprising cutting, grinding, abrading, or burnishing.

* * * * *